United States Patent
Tomizawa et al.

(10) Patent No.: US 12,046,213 B2
(45) Date of Patent: Jul. 23, 2024

(54) DISPLAY DEVICE

(71) Applicant: Japan Display Inc., Tokyo (JP)

(72) Inventors: Kazunari Tomizawa, Tokyo (JP);
Tadafumi Ozaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/869,000

(22) Filed: Jul. 20, 2022

(65) Prior Publication Data

US 2022/0358893 A1 Nov. 10, 2022

Related U.S. Application Data

(63) Continuation of application No. PCT/JP2021/001951, filed on Jan. 21, 2021.

(30) Foreign Application Priority Data

Jan. 22, 2020 (JP) .................................. 2020-008584

(51) Int. Cl.
*G09G 3/34* (2006.01)
*G02F 1/13357* (2006.01)
*G09G 3/36* (2006.01)

(52) U.S. Cl.
CPC ......... *G09G 3/3677* (2013.01); *G02F 1/1336* (2013.01); *G09G 3/3406* (2013.01);
(Continued)

(58) Field of Classification Search
CPC ......... G09G 3/3413; G09G 2310/0237; G09G 2310/08; G09G 3/3677; G09G 3/3406;
(Continued)

(56) References Cited

U.S. PATENT DOCUMENTS

| | | | |
|---|---|---|---|
| 10,839,761 B2 | 11/2020 | Aoki et al. | |
| 2004/0252097 A1* | 12/2004 | Kaneki | G09G 3/342 345/102 |

(Continued)

FOREIGN PATENT DOCUMENTS

| | | |
|---|---|---|
| JP | 2008-536164 A | 9/2008 |
| JP | 2010-141370 A | 6/2010 |

(Continued)

OTHER PUBLICATIONS

International Search Report issued in International Patent Application No. PCT/JP2021/001951 on Apr. 13, 2021 and English translation of same. 7 pages.

(Continued)

*Primary Examiner* — Dismery Mercedes
(74) *Attorney, Agent, or Firm* — K&L Gates LLP

(57) ABSTRACT

A display device includes: a display panel with pixel rows; a light source device having light emission regions; and a controller configured to control light emission of the light emission regions. A second period is shorter than a first period. The first period is a period from a drive timing of one or more pixel rows that are driven first to a drive timing of one or more other pixel rows that are driven last. The second period is a period from a light emission timing of one or more light emission regions that emit light first to a light emission timing of one or more other light emission regions that emit light last. The light emission timing of the one or more light emission regions that emit light first is different from the light emission timing of the one or more other light emission regions that emit light last.

18 Claims, 23 Drawing Sheets

(52) U.S. Cl.
CPC ........... *G09G 3/342* (2013.01); *G09G 3/3426* (2013.01); *G09G 2310/024* (2013.01); *G09G 2310/08* (2013.01); *G09G 2320/0252* (2013.01)

(58) Field of Classification Search
CPC ........... G09G 2320/0646; G09G 3/342; G09G 3/3648; G09G 2320/0252; G09G 3/3426; G09G 3/34; G02F 1/133603; G02F 1/133622; G02F 1/133602; G02F 1/133611; G02B 6/0066; G02B 6/0068
See application file for complete search history.

(56) References Cited

U.S. PATENT DOCUMENTS

| | | | | |
|---|---|---|---|---|
| 2008/0238858 | A1* | 10/2008 | Seong | G09G 3/3426 345/102 |
| 2010/0134402 | A1* | 6/2010 | Groot Hulze | G09G 3/342 345/102 |
| 2010/0188439 | A1* | 7/2010 | Sugimoto | G09G 3/342 345/102 |
| 2011/0050865 | A1 | 3/2011 | Seong et al. | |
| 2011/0141003 | A1* | 6/2011 | Kim | G09G 3/342 345/102 |
| 2011/0228182 | A1* | 9/2011 | Lee | H04N 13/341 349/15 |
| 2013/0278490 | A1* | 10/2013 | Kuwayama | G09G 5/10 345/98 |
| 2016/0231497 | A1* | 8/2016 | Kato | G09G 3/3406 |
| 2017/0256210 | A1* | 9/2017 | Kato | G02F 1/137 |
| 2017/0308161 | A1* | 10/2017 | Richards | G09G 3/3406 |
| 2018/0240424 | A1* | 8/2018 | Aoki | G09G 3/3406 |
| 2021/0096423 | A1* | 4/2021 | Shin | G09G 3/342 |

FOREIGN PATENT DOCUMENTS

| | | |
|---|---|---|
| JP | 2011-053648 A | 3/2011 |
| JP | 2013-205502 A | 10/2013 |
| JP | 2014-164218 A | 9/2014 |
| JP | 2018-136495 A | 8/2018 |
| KR | 10-2004-0057757 A | 7/2004 |

OTHER PUBLICATIONS

Written Opinion issued in International Patent Application No. PCT/JP2021/001951 on Apr. 13, 2021. 4 pages.

Office Action issued in related Japanese Patent Application No. 2020-008584 mailed on Jul. 25, 2023 and English translation of same. 7 pages.

* cited by examiner

DISPLAY DEVICE

CROSS-REFERENCE TO RELATED APPLICATION

This application claims the benefit of priority from Japanese Patent Application No. 2020-008584 filed on Jan. 22, 2020 and International Patent Application No. PCT/JP2021/001951 filed on Jan. 21, 2021, the entire contents of which are incorporated herein by reference.

BACKGROUND

1. Technical Field

What is disclosed herein relates to a display device.

2. Description of the Related Art

In conventional light source control in a liquid crystal display device, a light source is turned on to illuminate the entire region at a time after response of all pixels to a frame image input is completed (for example, Japanese Patent Application Laid-open Publication No. 2018-136495).

With the conventional light source control, a pixel update corresponding to a subsequent frame image cannot be started before lighting of the light source is finished, and it is difficult to improve a frame rate. In addition, as lighting time of the light source that illuminates the entire region at a time becomes longer, there is a problem in that an afterimage is likely to be viewed in a moving image.

For the foregoing reasons, there is a need for a display device in which a frame rate is improved more easily and afterimages are unlikely to be viewed.

SUMMARY

According to an aspect, a display device includes: a display panel in which a plurality of pixel rows are aligned in a first direction; a light source device having a plurality of light emission regions aligned in the first direction; and a controller configured to control light emission from each of the light emission regions. Each of the pixel rows has a plurality of pixels aligned in a second direction intersecting with the first direction. A second period is shorter than a first period. The first period is a period from a drive timing of one or more pixel rows that are driven first among the pixel rows related to display of one frame image to a drive timing of one or more other pixel rows that are driven last, and the second period is a period from a light emission timing of one or more light emission regions that emit light first among the light emission regions related to the display of the one frame image to a light emission timing of one or more other light emission regions that emit light last. The light emission timing of the one or more light emission regions that emit light first is different from the light emission timing of the one or more other light emission regions that emit light last.

According to an aspect, a display device includes: a display panel in which a plurality of pixel rows are aligned in a first direction; a light source device having a plurality of light emission regions aligned in the first direction; and a controller configured to control light emission from each of the light emission regions. Each of the pixel rows has a plurality of pixels aligned in a second direction intersecting with the first direction. One or more pixel rows that are driven first and one or more light emission regions that emit light first are arranged at a center in the first direction or at one of both ends in the first direction. One or more other pixel rows that are driven last and one or more other light emission regions that emit light last are arranged at the center in the first direction or at another of both ends in the first direction. A driving order of the pixel rows and a light emission order of the light emission regions are an order from the one end side to the other end side.

DETAILED DESCRIPTION

Figure 1:
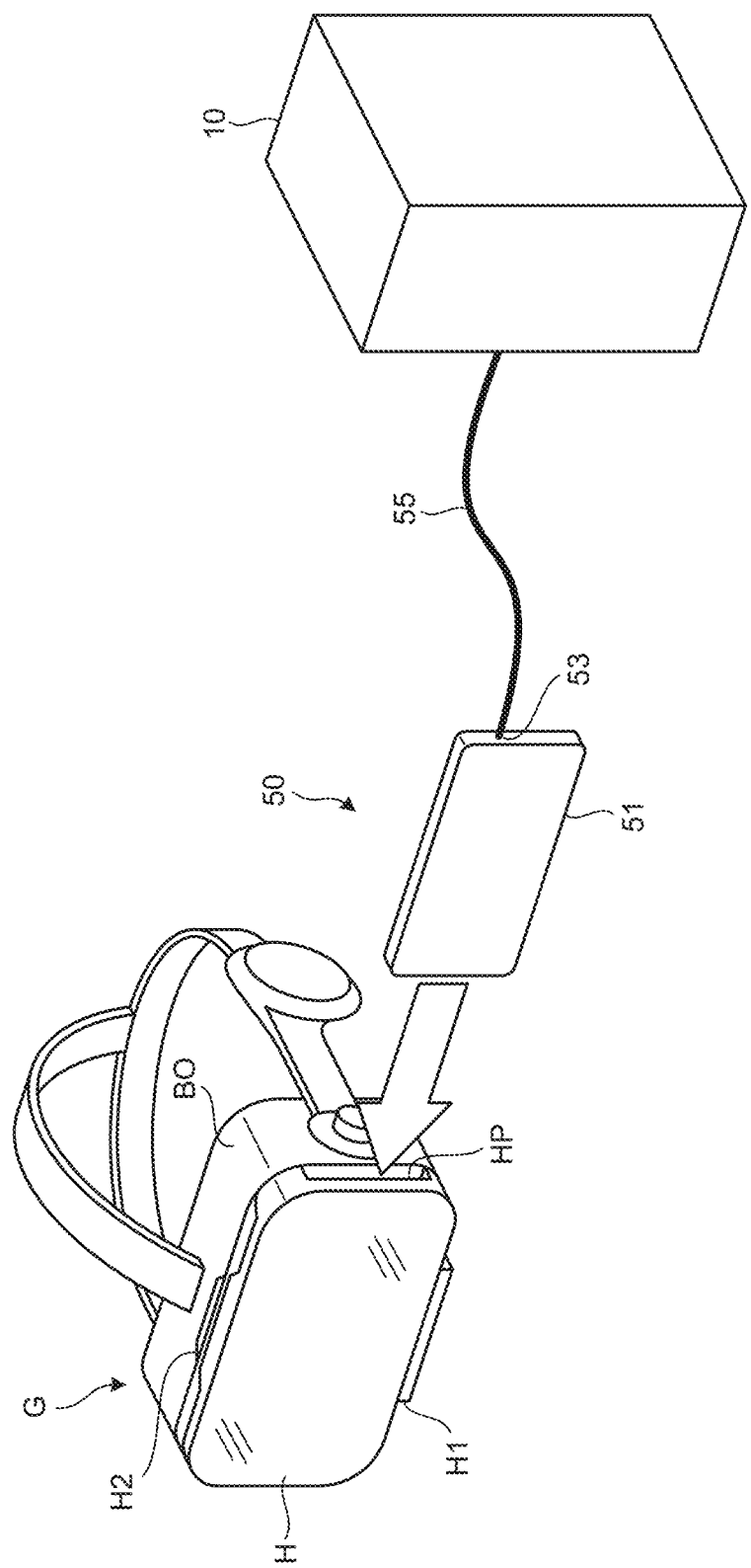
FIG. 1 is a view illustrating the main configuration of a display system according to a first embodiment.

Hereinafter, embodiments of the present disclosure will be described with reference to the drawings. What is disclosed herein is merely an example, and it is needless to say that appropriate modifications within the gist of the disclosure at which those skilled in the art can easily arrive are encompassed in the range of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred, and detail explanation thereof can be appropriately omitted.

In this disclosure, when an element is described as being "on" another element, the element can be directly on the other element, or there can be one or more elements between the element and the other element.

First Embodiment

Figure 2:
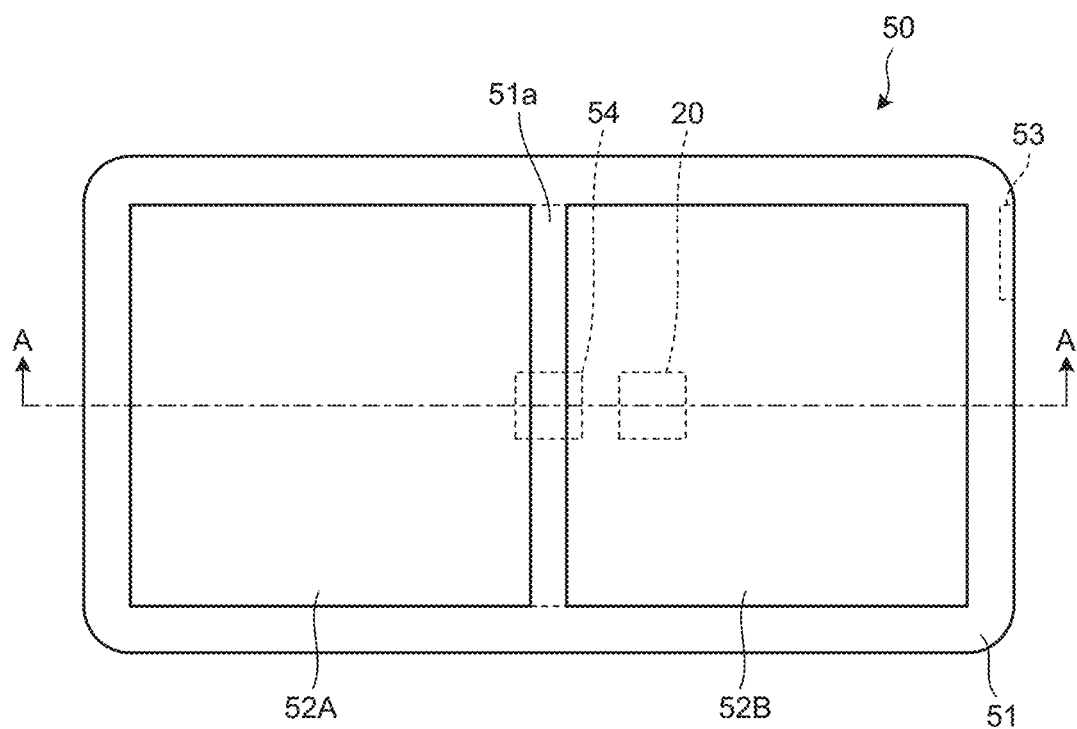
FIG. 2 is a view illustrating the main configuration of a display device.
Figure 3:
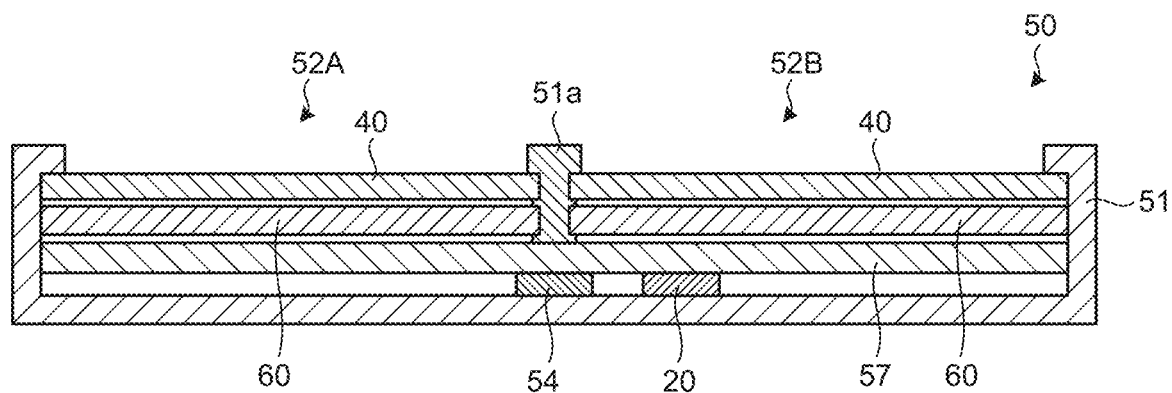
FIG. 3 is a cross-sectional view cut along line A-A in FIG. 2.

FIG. 1 is a view illustrating the main configuration of a display system according to a first embodiment. FIG. 2 is a view illustrating the main configuration of a display device 50. FIG. 3 is a cross-sectional view cut along line A-A in FIG. 2. The display system includes the display device 50 and an information processing device 10. The display device 50 is provided for VR goggles G in a detachable manner. When a user views an image, the display device 50 is mounted on the VR goggles G. The VR goggles G are a device supporting the display device 50 in the vicinity of the user's head such that the user's visual line matches with two displays 52A and 52B included in the display device 50.

It is sufficient that the VR goggles G can accommodate the display device 50 and support the display device 50 in the vicinity of the user's head for use. The VR goggles G are not limited to goggles for displaying virtual reality (VR) video images and may be goggles for displaying video images of augmented reality (AR), mixed reality (MR), or the like.

The VR Goggles G include, for example, a housing BO and a holder H. The housing BO and the holder H are connected to each other in a rotationally movable manner with, for example, a hinge portion H1 as a rotation shaft. A claw portion H2 is provided on the opposite side to the hinge portion H1. The claw portion H2 is a portion that is hooked onto the housing BO in order to fix the holder H to the housing BO. The display device 50 is placed between the housing BO and the holder H. To mount the display device 50 on the VR goggles G, a gap between the housing BO and the holder H is provided by rotationally moving the holder H with respect to the housing BO in a state where the fixation of the holder H to the housing BO by the claw portion H2 is released. In this state, the display device 50 is placed between the housing BO and the holder H, and the holder H is rotationally moved such that the claw portion H2 is hooked on the housing BO, whereby the display device 50 is held between the holder H and the housing BO. The VR goggles G may, for example, have an opening HP and couple the housing BO and the holder H together such that the display device 50 and a cable 55 pass through the opening HP when the display device 50 is placed in an accommodation portion. The structure of the accommodation portion is not limited thereto. The holder H may be formed integrally with the housing BO, and an opening through which the display device 50 can be inserted may be provided in the side surface or the upper surface of the holder H. The housing BO has openings W1 and W2. The user views images on the displays 52A and 52B through the openings W1 and W2. In other words, when the display device 50 is held between the holder H and the housing BO, the openings W1 and W2 and the displays 52A and 52B are brought into alignment with each other. The VR goggles G also have, as a fixture for mounting the VR goggles G on a user's head, a ring-shaped band passing on the sides of the user's head and a band passing on the top of the head and coupled to the ring-shaped band. The structure of the fixture is not limited thereto and may have only the ring-shaped band passing only on the side of the head or may be a hook-like structure that is hooked over the ears like glasses. Alternatively, no fixture may be provided. The VR goggles G are used while being placed in the vicinity of the head by the fixture or being gripped by the user's hand in a state of accommodating the display device 50 therein such that an image displayed by the display device 50 is displayed in front of the user's eyes through the VR goggles G.

The information processing device 10 outputs an image to the display device 50. The information processing device 10 is coupled to the display device 50 via, for example, the cable 55. The cable 55 transfers signals between the information processing device 10 and the display device 50. The signals include an image signal Sig2 that is output from the information processing device 10 to the display device 50. A specific configuration of coupling between the information processing device 10 and the display device 50 is not limited to that via the cable 55 and may be that via wireless communication.

The display device 50 includes, for example, a housing 51, the two displays 52A and 52B, an interface 53, a multiaxial sensor 54, a substrate 57, and a signal processor (signal processing circuit) 20, as illustrated in FIG. 2 and FIG. 3.

The housing 51 holds other components of the display device 50. For example, the housing 51 holds the display 52A and the display 52B in a state where they are arranged side by side with a predetermined gap therebetween. Although a partition 51a is provided between the display 52A and the display 52B in the example illustrated in FIG. 2, the partition 51a may be omitted.

The displays 52A and 52B are independently operable display panels. In the first embodiment, the displays 52A and 52B are liquid crystal display panels each having an image display panel driver 30, a display panel 40, and a light source device 60.

The image display panel driver 30 controls driving of the display panel 40 based on signals from the signal processor 20. The display panel 40 includes, for example, a first substrate 42 and a second substrate 43. Liquid crystal forming a liquid crystal layer (not illustrated) is sealed between the first substrate 42 and the second substrate 43. The image display panel driver 30 is provided on the first substrate 42. The light source device 60 illuminates the display panel 40 from the rear surface. The display panel 40 displays an image by signals from the image display panel driver 30 and light from the light source device 60.

The interface 53 is a coupling portion capable of being coupled to the cable 55. Specifically, the interface 53 is, for example, an interface in which a high definition multimedia interface (HDMI (registered trademark)) interface and a universal serial bus (USB) are integrated. Although not illustrated in the drawings, the cable 55 is branched into the HDMI interface and the USB interface on the information processing device 10 side.

The sensor 54 is arranged in the display device 50 and is a sensor for detecting movement of the display device 50. The sensor 54 is a sensor capable of detecting movement of the user when the display device 50 is accommodated in the VR goggles and is mounted on the user in the display system. The sensor 54 and the signal processor 20 are circuits provided on the substrate 57. The interface 53 is coupled to the displays 52A and 52B, the sensor 54, and the signal processor 20 through the substrate 57.

The display device 50 operates by receiving power supply from the information processing device 10 coupled thereto via the interface 53, for example. Alternatively, the display device 50 may include its own power source.

Figure 4:
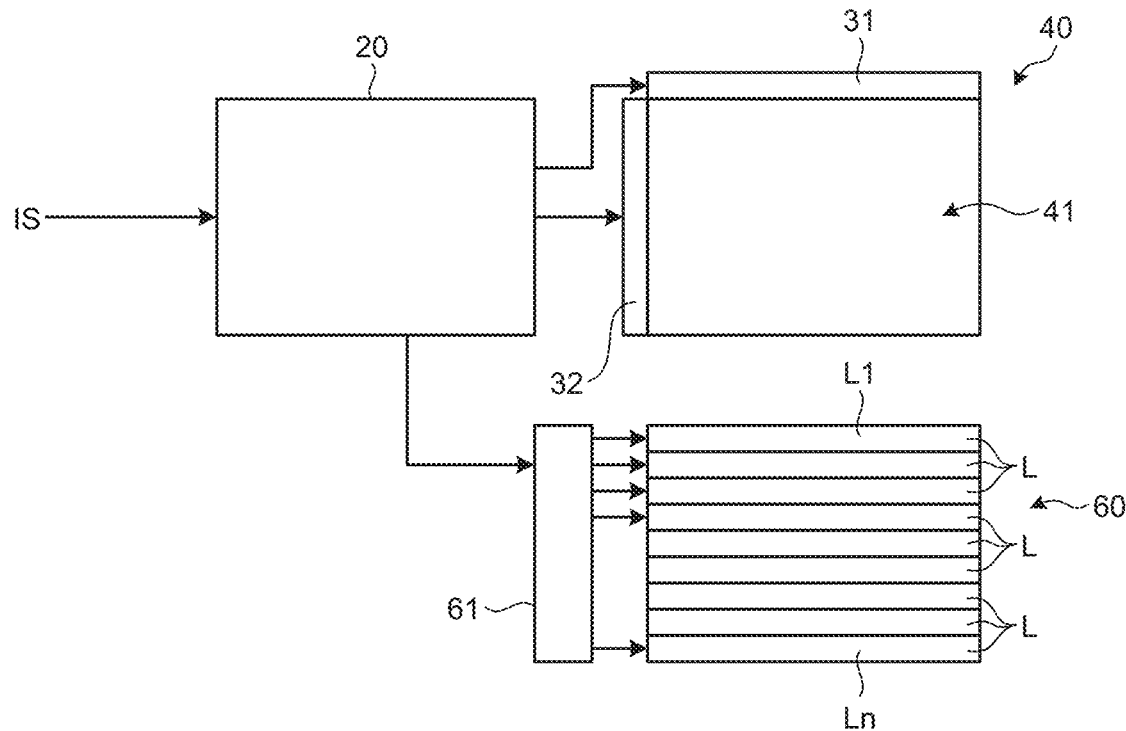
FIG. 4 is a schematic view illustrating an example of a relation between a signal processor, a display panel, and a light source device.
Figure 5:
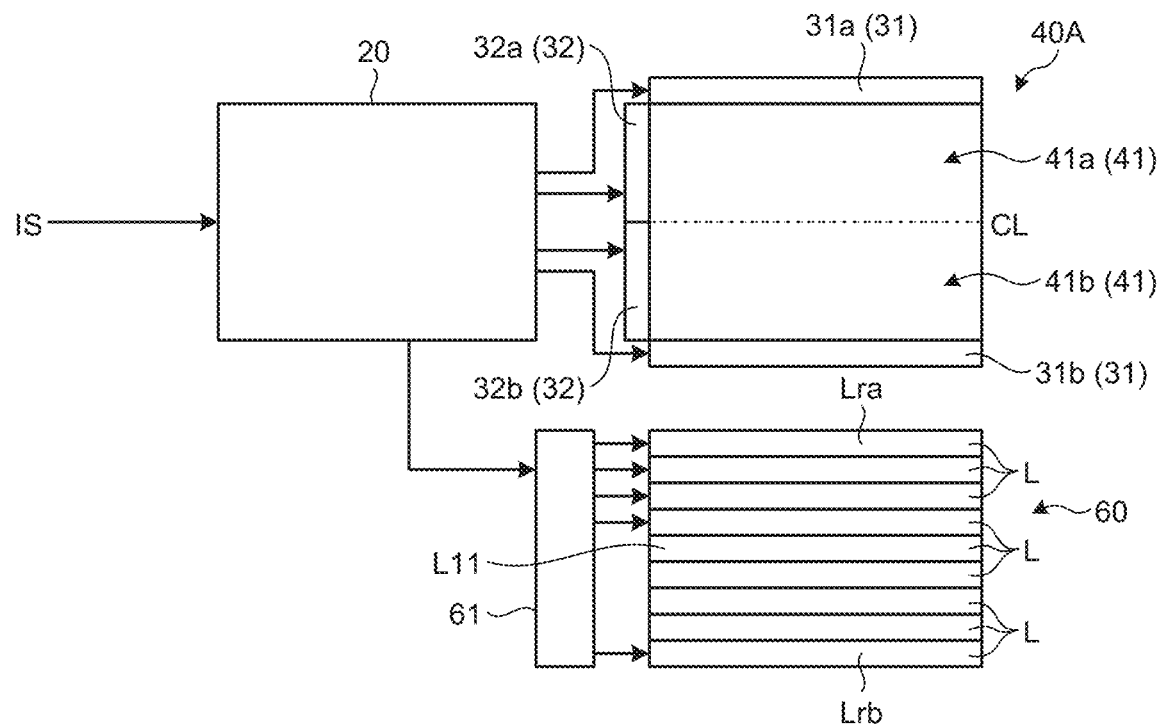
FIG. 5 is a schematic view illustrating an example of a relation between the signal processor, another display panel, and the light source device.

FIG. 4 is a schematic view illustrating an example of a relation between the signal processor 20, the display panel 40, and the light source device 60. FIG. 5 is a schematic view illustrating an example of a relation between the signal processor 20, a display panel 40A, and the light source device 60. Each of the display panel 40 and the display panel 40A includes a signal output circuit 31 and a scan circuit 32.

Figure 6:
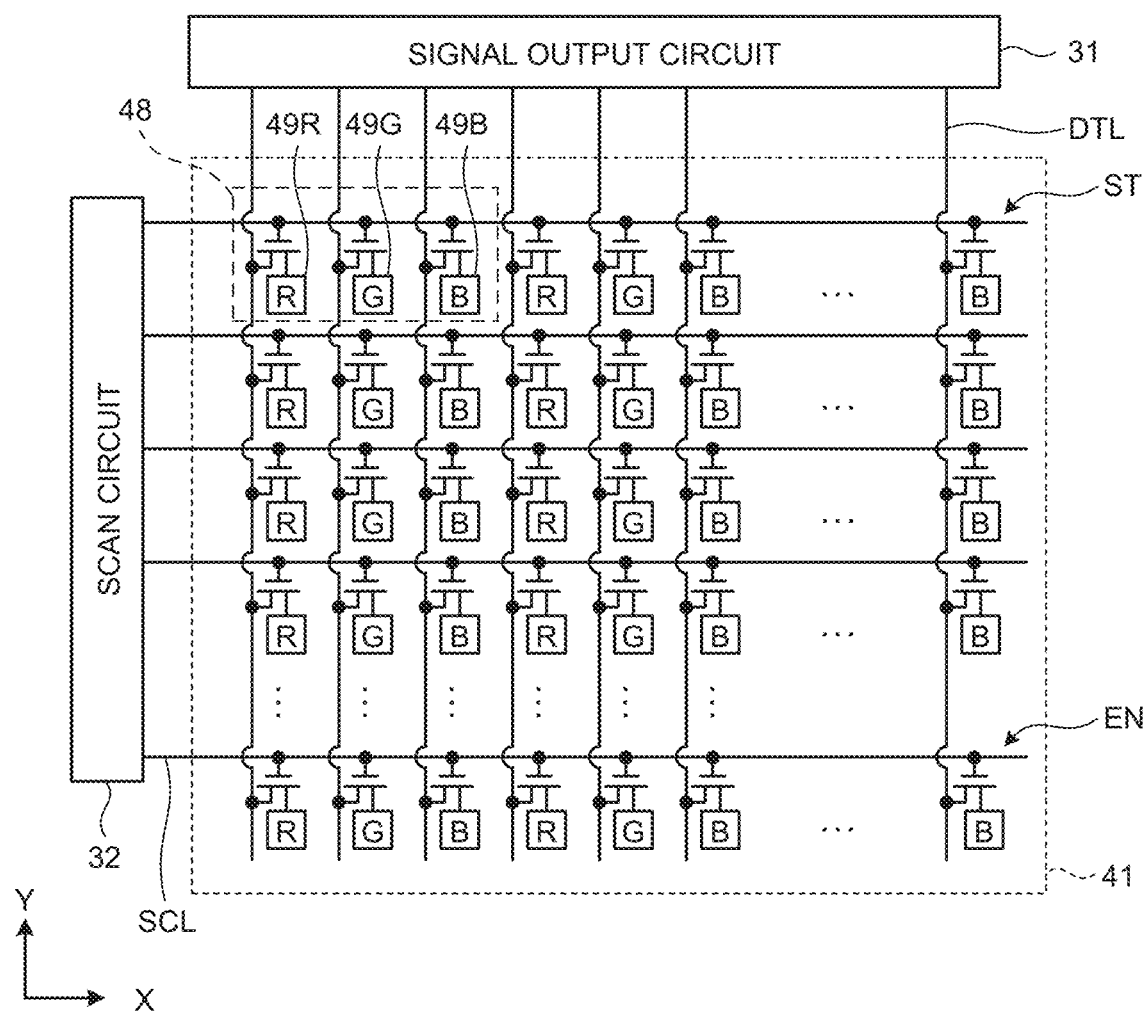
FIG. 6 is a schematic view illustrating an example of the configuration of the display panel.

FIG. 6 is a schematic view illustrating an example of the configuration of the display panel 40. The display panel 40 has a plurality of pixels 48 in an image display region 41. To be specific, as illustrated in FIG. 6, each of the pixels 48 includes, for example, a first sub pixel 49R, a second sub pixel 49G, and a third sub pixel 49B.

The first sub pixel 49R displays a first color (for example, red). The second sub pixel 49G displays a second color (for example, green). The third sub pixel 49B displays a third color (for example, blue). The first color, the second color, and the third color are not limited to red, green, and blue, and may be complementary colors or the like. It is sufficient that they are different from one another. In the following explanation, when the first sub pixel 49R, the second sub pixel 49G, and the third sub pixel 49B need not to be distinguished from one another, they are referred to as sub pixels 49. That is to say, one of the three colors is assigned to any one of the sub pixels 49. Four or more colors may be assigned to the sub pixels 49 forming each of the pixels 48.

The display panel 40 is, for example, a transmissive color liquid crystal display panel. First color filters that transmit the first color are arranged between the first sub pixels 49R and a user in the display panel 40. Second color filters that transmit the second color are arranged between the second sub pixels 49G and the user in the display panel 40. Third color filters that transmit the third color are arranged between the third sub pixels 49B and the user in the display panel 40.

The signal output circuit 31 outputs, to the display panel 40, an image signal having a predetermined potential corresponding to an output signal from the signal processor 20. The signal output circuit 31 is electrically coupled to the display panel 40 by signal lines DTL. The scan circuit 32 controls ON and OFF of switching elements for controlling operations (light transmittances) of the sub pixels 49 in the display panel 40. The switching elements are, for example, thin film transistors (TFTs). The scan circuit 32 is electrically coupled to the display panel 40 by scan lines SCL. The scan circuit 32 functioning as a drive circuit, outputs a drive signal to the predetermined number of scan lines SCL to drive the sub pixels 49 coupled to the scan lines SCL to which the drive signal is output. The switching elements of the sub pixels 49 are turned ON in response to the drive signal and transmit potentials corresponding to the image signal to pixel electrodes and potential holders (capacitors or the like) of the sub pixels 49 via the signal lines DTL. Orientations of liquid crystal molecules contained in the liquid crystal layer of the display panel 40 are determined so as to correspond to the potentials of the pixel electrodes. The light transmittances of the sub pixels 49 are thereby controlled. The scan circuit 32 scans the display panel 40 by shifting sequentially the scan lines SCL to which the drive signal is output.

The scan lines SCL are aligned in the Y direction. Each of the scan lines SCL extends in the X direction. The sub pixels 49 aligned in the X direction share the scan lines SCL. The sub pixels 49 sharing the same scan line SCL are driven at the same timing in accordance with the drive signal. In the following explanation, the pixels 48 aligned in the X direction are described as a pixel row. One pixel row includes the sub pixels 49 sharing one scan line SCL.

As illustrated in FIG. 6, one of ends of the image display region 41 in the Y direction is referred to as one end ST and the other end thereof is referred to as the other end EN. In scanning by the scan circuit 32, an output target of the drive signal transitions sequentially from the one end ST side to the other end EN side or from the other end EN side to the one end ST side. In the following explanation, the output target of the drive signal transitions sequentially from the one end ST side to the other end EN side, as an example.

The display panel 40 illustrated in FIG. 4 includes one signal output circuit 31, one scan circuit 32, and one image display region 41. The display panel 40 displays and outputs a frame image in the one image display region 41. The display panel 40A illustrated in FIG. 5 includes two signal output circuits 31 (31a, 31b), two scan circuits 32 (32a, 32b), and two image display regions 41 (41a, 41b). In the configuration illustrated in FIG. 5, each of the two signal output circuits 31, the two scan circuits 32, and the two image display regions 41 is marked with a lowercase alphabet character (a or b) at the end of its numerical reference for the purpose of distinguishing them. The sub pixels 49 in the image display region 41a are driven in accordance with a drive signal from the scan circuit 32a and controlled to have light transmittances corresponding to an image signal from the signal output circuit 31a. The sub pixels 49 in the image display region 41b are driven in accordance with a drive signal from the scan circuit 32b and controlled to have light transmittances corresponding to an image signal from the signal output circuit 31b. The display panel 40A displays and outputs a frame image with cooperation between the image display region 41a and the image display region 41b. The configuration illustrated in FIG. 5 thus includes a first drive circuit (image display region 41a) and a second drive circuit (image display region 41b). The first drive circuit is configured to drive the pixel rows arranged on the one end side in a first direction (Y direction) with respect to the center in the first direction. The second drive circuit is configured to drive the pixel rows arranged on the other end side in the first direction with respect to the center in the first direction. The scan directions of the image display region 41a and the image display region 41b aligned in the Y direction are symmetrical with respect to a boundary CL between the image display region 41a and the image display region 41b. Unless otherwise specified below, the configuration illustrated in FIG. 4 is employed.

The light source device 60 is arranged on the rear surface of the display panel 40. The light source device 60 illuminates the display panel 40 by emitting light toward the display panel 40.

As illustrated in FIG. 4 and FIG. 5, the light source device 60 has a plurality of light emission regions L. The light emission regions L are aligned in the Y direction. Each of the light emission regions L includes an individual light source. The light sources of the light emission regions L are, for example, light emitting diodes (LEDs) but are not limited thereto. The light sources can be any light sources the light emission of which can be individually controlled for each light emission region L, and may be cold cathode fluorescent lamps (CCFL), for example. The light sources are coupled to a light source driver circuit 61. The light source driver circuit 61 controls the light emission timing, light emission time, and light emission intensity of each of the light sources under operation control by the signal processor 20. In other words, the signal processor 20 functions as a controller configured to control light emission from each of the light emission regions L. The numbers of light emission regions L illustrated in FIG. 4 and FIG. 5 do not represent the actual numbers of light emission regions L but are only schematic. Similarly, the numbers of various components such as the number of pixel rows in FIG. 6 do not represent the actual numbers thereof but are only schematic numbers.

The signal processor 20 controls display output to be displayed by the display device 50, by outputting various signals for controlling operations of the signal output circuit 31, the scan circuit 32, and the light source driver circuit 61 in accordance with an input signal IS from the information processing device 10.

The display device 50 receives frame image signals sequentially as the input signal IS, and the number of the frame image signals depends on a frame rate. The frame rate corresponds to the number of the frame images that are displayed for a predetermined period of time (for example, one second). The image display region 41 is periodically scanned repeatedly in accordance with the frame rate, and the image signals corresponding to the frame images are applied to the sub pixels 49, so that the display output is updated.

Prior to explanation of the first embodiment, the basic concept of a relation between drive timings of the sub pixels 49 by scanning by the scan circuit 32 and response completion timings of the sub pixels 49 in the pixel rows and a relation between the response completion timings of the sub pixels 49 in the pixel rows and the light emission timing of the light source device 60 will be explained with reference to FIG. 7. In the following explanation with reference to FIG. 7 and subsequent drawings, a period of time for applying the image signal corresponding to one frame image to the sub pixels 49 is referred to as one frame period F.

Figure 7:
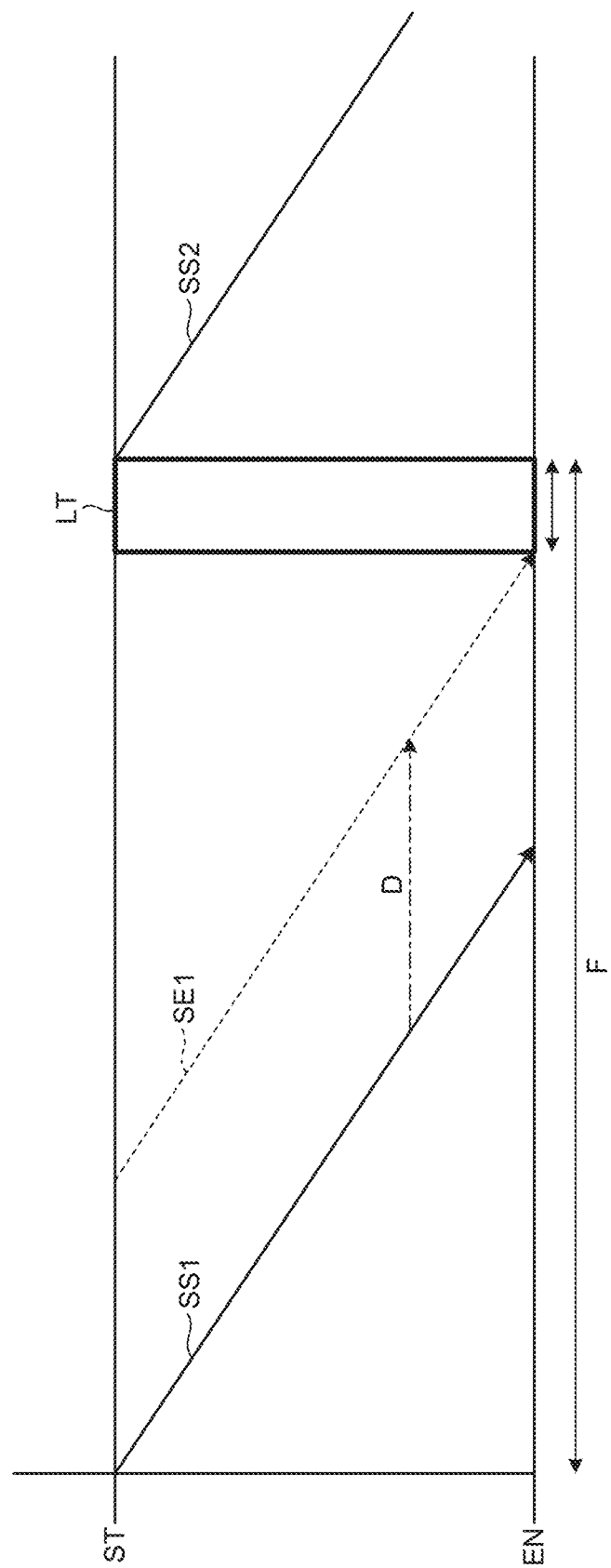
FIG. 7 is a time chart illustrating the basic concept of a relation between drive timings of sub pixels in pixel rows, response completion timings of the sub pixels in the pixel rows, and a light emission timing by the light source device.

FIG. 7 is a time chart illustrating the basic concept of the relation between the drive timings of the sub pixels 49 in the pixel rows, the response completion timings of the sub pixels 49 in the pixel rows, and the light emission timing of the light source device 60. As described above, in scanning by the scan circuit 32, the output target of the drive signal transitions sequentially from the one end ST side to the other end EN side. In FIG. 7 and other figures, an arrow SS1 indicates progression of scanning that is performed sequentially from the one end ST side to the other end EN side within one frame period F. The drive timings of the sub pixels 49 in the pixel rows correspond to the progression of the scanning that is indicated by the arrow SS1.

The liquid crystal molecules in the sub pixels 49 are controlled to be oriented in accordance with the image signal applied at a timing (drive timing) at which the sub pixels 49 are driven in accordance with the drive signal. The completion timing (response completion timing) of the operation in which the liquid crystal molecules are oriented in accordance with the image signal is later than the drive timing of the sub pixels 49. In FIG. 7, passage of elapsed time (response time) from the drive timings of the sub pixels 49 in the pixel rows to the response completion timings is indicated by an arrow D. In FIG. 7 and other figures, progression of the response completion timings of the sub pixels 49 in the pixel rows that occurs with progression of the scanning indicated by the arrow SS1, is indicated by an arrow SE1.

Each of the pixel rows is driven once during one frame period F. Scanning corresponding to a subsequent frame image is performed after one frame period F in response to an update of the frame image. In FIG. 7 and other figures, an arrow SS2 indicates progression of scanning corresponding to the subsequent frame image.

The arrow SE1 and the arrow D, which are set corresponding to the arrow SS1, indicate "expected maximum" time that is the latest response time and do not reflect individually actual time for each sub pixel 49 to complete the response.

If all the light emission regions L emit light to the display panel 40 at the same timing, light is emitted in an irradiation period LT between the arrow SE1 and the arrow SS2. When a moving image is displayed and output by successive frame images, ease of viewing of an afterimage varies depending on the time length of the irradiation period LT, that is, the length of light irradiation time for each frame image.

Figure 8:
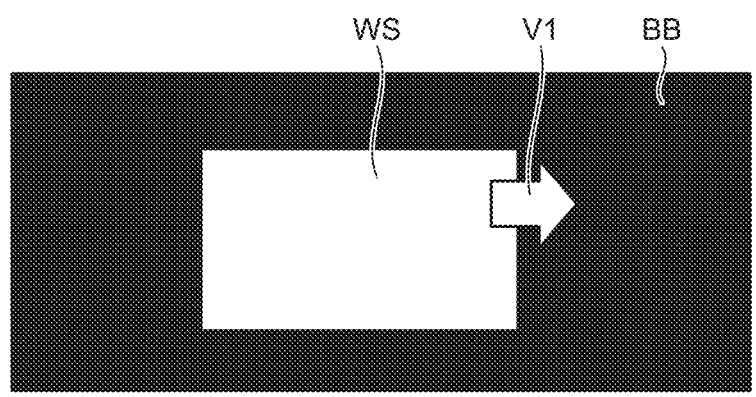
FIG. 8 is a schematic view illustrating an example of a moving image in which an afterimage can be viewed.

FIG. 8 is a schematic view illustrating an example of the moving image in which the afterimage can be viewed. As illustrated in FIG. 8, assume that a case where the moving image depicting a white rectangle WS that keeps moving in the direction of an arrow V1 in a black background BB is represented by the update and output of the frame images.

Figure 9:
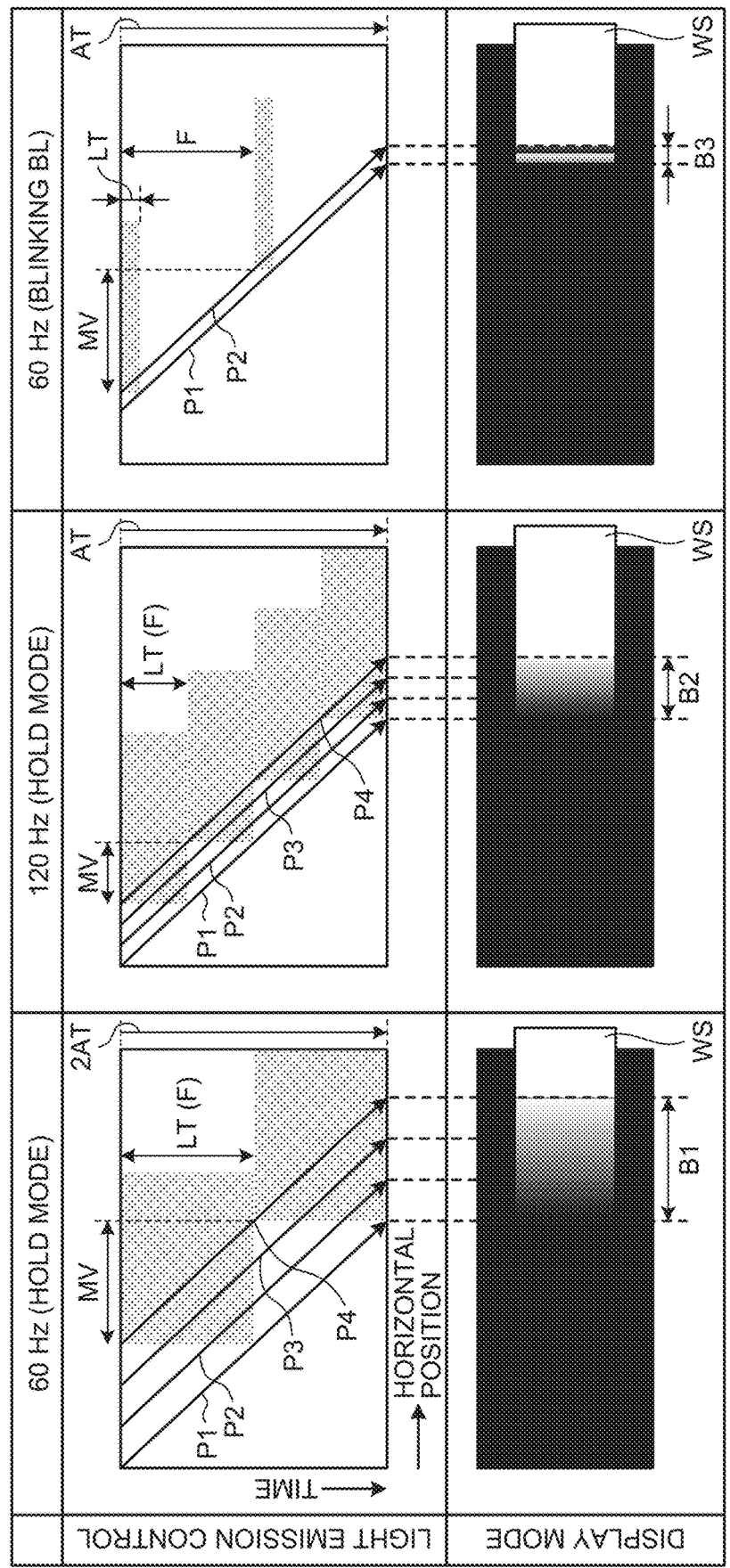
FIG. 9 is a view illustrating a relation between the manifestation degree of the afterimage, a frame rate, and light irradiation time.

FIG. 9 is a view illustrating a relation between the manifestation degree of the afterimage, the frame rate, and light irradiation time. FIG. 9 schematically illustrates a mechanism of reproducing such a moving image that a position of the white rectangle WS is viewed so as to move in the direction of the arrow V1 in FIG. 8. In the mechanism, more than one frame image is displayed consecutively. The positions P1, P2, . . . , and P4 (or P1 and P2) of the white rectangle WS in the respective frame images are shifted from each other, whereby the moving image is reproduced. In general, as the frame rate is higher, the afterimage is less likely to be viewed. FIG. 9 illustrates, as examples, a band B1 of the afterimage of the white rectangle WS in the black background BB that is generated when the frame rate is 60 [Hz] and a band B2 of the afterimage of the white rectangle WS in the black background BB that is generated when the frame rate is 120 [Hz]. When the number of updated frame images is the same in both cases as indicated by the number of positions P1, P2, . . . , and P4, time AT when the frame rate is 120 [Hz] is half of time 2AT when the frame rate is 60 [Hz]. Thus, the movement amount of the white rectangle WS generated in every update of the frame image is smaller when the frame rate is 120 [Hz] than when the frame rate is 60 [Hz] in the case where the movement amount in the direction of the arrow V1 per time is the same. The width of the band B2 in the movement direction of the white rectangle WS is therefore less than that of the band B1. This indicates that the band B2 is less likely to be viewed than the band B1 is. A movement width MV indicates the movement amount of an illumination position that is generated when local dimming is employed. That is to say, the movement width MV indicates the movement amount of the illumination position corresponding to the movement of the white rectangle WS caused by the update of the frame image.

As light irradiation time within the irradiation period LT is shorter, the afterimage is less likely to be viewed. FIG. 9 illustrates, as examples, the band B2 of the afterimage of the white rectangle WS in the black background BB that is generated when a hold mode is employed and a band B3 of the afterimage of the white rectangle WS in the black background BB that is generated when blinking back light (BL) is employed. The hold mode is a mode in which light is always emitted during the irradiation period LT. The blinking BL is a mode in which light is emitted during part of the irradiation period LT. The one frame period F and the irradiation period LT are substantially the same in the hold mode; whereas the irradiation period LT is significantly shorter than one frame period F in the blinking BL. In the comparison between the band B2 and the band B3, the bands B2 and B3 of the afterimages that are generated within the same time AT are compared with each other. The width of the band B3 in the movement direction of the white rectangle WS is less than that of the band B2. This indicates that the band B3 is less likely to be viewed than the band B2 is. Since the band B2 is less likely to be viewed than the band B1 is, it is needless to say that the band B3 is less likely to be viewed than the band B1 is.

As described above, reduction in light irradiation time tends to provide a higher effect on reduction in the afterimage rather than increase in the frame rate. Light irradiation time in the blinking BL is shorter than that in the hold mode. When the blinking BL is employed, it is therefore necessary to further increase the luminance of the light emission regions L to provide sufficient light intensity.

As indicated by the irradiation period LT in FIG. 7, an interval (time) in which all the light emission regions L emit light at a time is set between a completion point of the arrow SE1 and a start point of the arrow SS2 as a condition for realizing the blinking BL. The completion point of the arrow SE1 is the latest timing of the response completion timings of the sub pixels 49 indicated by the arrow SE1 (a tip of the arrow), that is, the response completion timing of the sub pixels 49 included in the pixel row coupled to the scan line SCL to which the drive signal is supplied last in one frame period F. The start point of the arrow SS2 is the earliest timing of the drive timings of the sub pixels 49 in the subsequent frame indicated by the arrow SS2 (a start end of the arrow), that is, the drive timing of the sub pixels 49 included in the pixel row coupled to the scan line SCL to which the drive signal is first supplied after the start of one frame period F following the arrow SE1.

In other words, when the start point of the arrow SS2 is set at a time before the completion point of the arrow SE1, the blinking BL cannot be implemented. For this reason, in order to employ the blinking BL, time for the irradiation period LT needs to be provided in each frame period F, and it becomes difficult to increase the frame rate.

Thus, in the first embodiment, the light emission control is performed which can achieve both reduction in the afterimage and easiness of improving the frame rate by setting the start point of the arrow SS2 at a time before the completion point of the arrow SE1.

Figure 10:
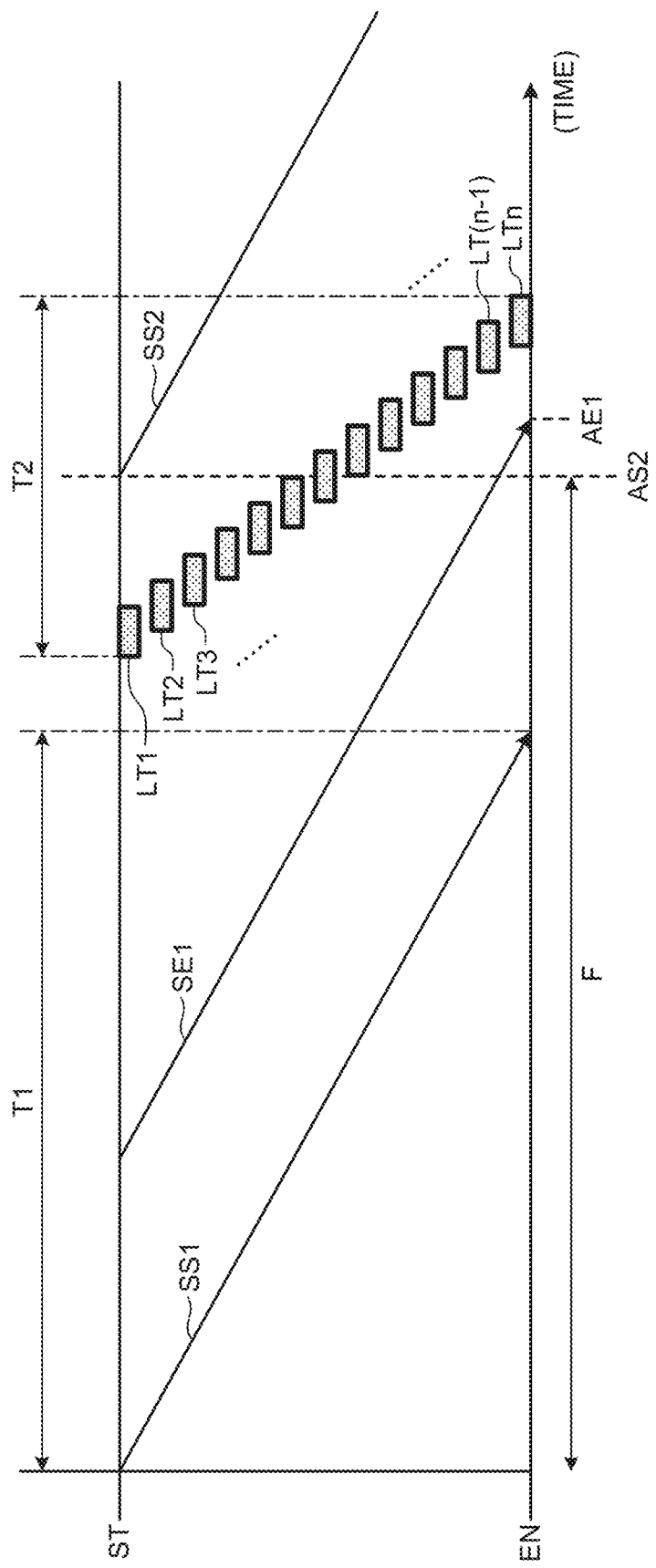
FIG. 10 is a time chart illustrating light emission control according to the first embodiment.

FIG. 10 is a time chart illustrating the light emission control in the first embodiment. Hereinafter, among the pixel rows related to display of one frame image, a pixel row that is driven first is referred to as a "first driven pixel row", and another pixel row that is driven last is referred to as a "last driven pixel row". Among the light emission regions L related to display of one frame image, a light emission region that emits light first is referred to as a "first light emission region", and another light emission region that emits light last is referred to as a "last light emission region". FIG. 10 illustrates a first period T1 as a period from the drive timing of the first driven pixel row to the drive timing of the last driven pixel row. FIG. 10 illustrates a second period T2 as a period from the light emission timing of the first light emission region to the light emission timing of the last light emission region. As illustrated in FIG. 10 and other figures, the second period T2 is provided after the first period T1 on the time axis, which indicates that light is emitted from the light source device 60 after the pixels 48 are driven. As illustrated in FIG. 10, a writing start timing AS2 of the first pixel row in the subsequent frame period of two consecutive frame periods is set before a completion timing AE1 of driving of the liquid crystal of the last pixel row in the previous frame period of the two consecutive frame periods, in the first embodiment.

As illustrated in FIG. 10, in the first embodiment, the second period T2 is shorter than the first period T1. In FIG. 10, the light emission periods of the respective light emission regions L are indicated by periods LT1, LT2, LT3, LT4, LT5, ..., LTm, ..., LT(n−1), and LTn. These periods LT1, LT2, LT3, LT4, LT5, ..., LTm, ..., LT(n−1), and LTn with different numbers (1 to n) at the ends of the reference numerals indicate light emission periods of different light emission regions L. The light emission timing is different between the first light emission region L and the last light emission region L in the second period T2. In other words, not all the light emission regions L are lit at the same timing. In the first embodiment, the light emission timings of the respective light emission regions L are different from one another. The light emission period of each of the light emission regions L, that is, each of the light emission periods LT1, LT2, LT3, LT4, LT5, ..., LTm, ..., LT(n−1), and LTn, is set in a period after the completion of response of the liquid crystal in the pixel row at a position corresponding to the light emission region L and before the start of driving of the pixel row corresponding to the subsequent frame image.

In the first embodiment, a cycle at which the light emission region L that emits light is switched in the second period T2 is constant. In the first embodiment, the plurality of (for example, n) light emission regions L aligned in the Y direction therefore start and end light emission sequentially from the one end ST side to the other end EN side at the constant cycle in the second period T2. In FIG. 10, the starts and the ends of light emission of the light emission regions L that occur at the constant cycle, are indicated by the periods LT1, LT2, LT3, LT4, LT5, ..., LTm, ..., LT(n−1), and LTn aligned at the constant cycle in the time direction. The period LT1 is, for example, the light emission period of the light emission region L1 illustrated in FIG. 4. The period LTn is, for example, the light emission period of the light emission region Ln illustrated in FIG. 4.

As indicated by the relation between the one end ST and the other end EN in FIG. 6, FIG. 10, and other figures, the first driven pixel row and the first light emission region L are arranged at one end (for example, the one end ST) of both ends in the first direction (Y direction). The last driven pixel row and the last light emission region L are arranged at the center in the first direction (Y direction) or the other end (for example, the other end EN) of both ends in the first direction (Y direction). The driving order of the pixel rows and the light emission order of the light emission regions L are the order from one side (for example, the one end ST) to the other side (for example, the other end EN). That is to say, the driving order of the pixel rows and the light emission order of the light emission regions L are the order from one end side (for example, the one end ST side) to the other end side (for example, the other end EN side) in the first direction (Y direction).

Figure 11:
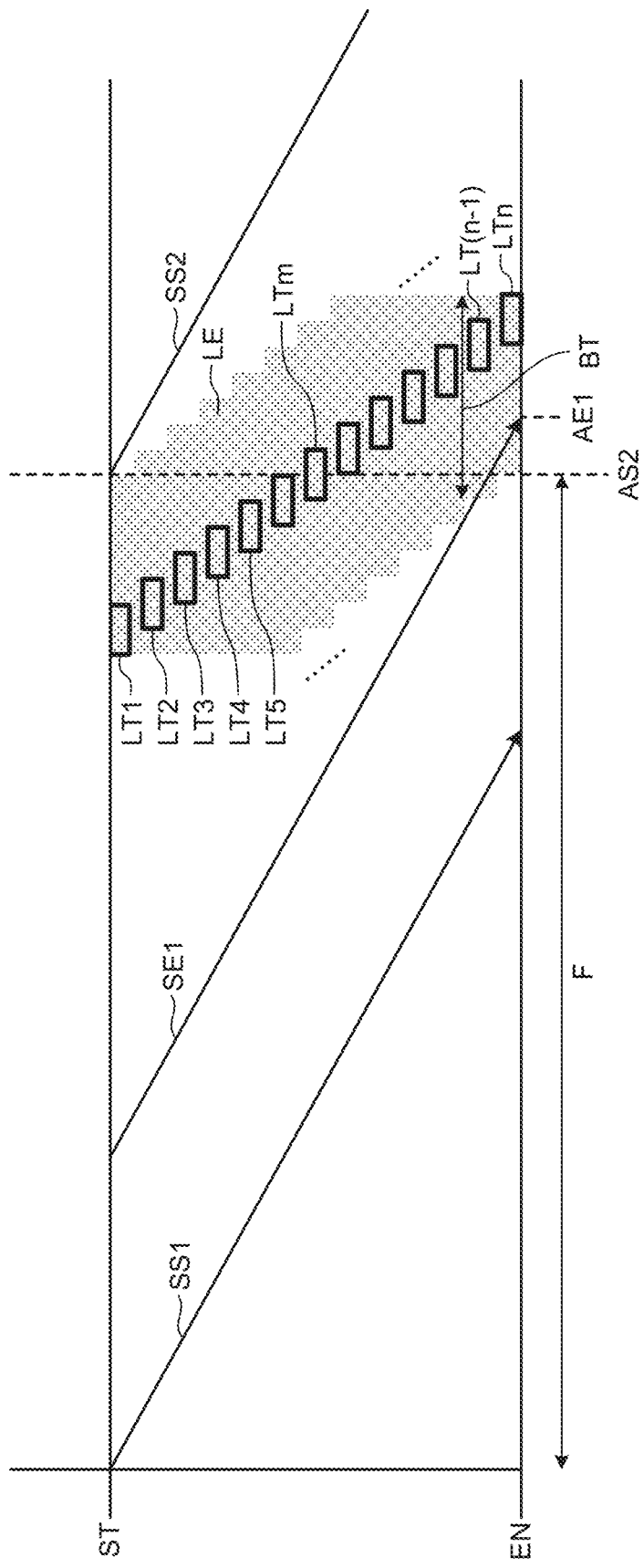
FIG. 11 is a time chart illustrating an example of light irradiation periods in accordance with a plurality of light emission periods of light emission regions.

FIG. 11 is a time chart illustrating an example of light irradiation periods BT in accordance with the light emission periods of the light emission regions L. The time chart in FIG. 11 is obtained by further adding, to the time chart illustrated in FIG. 10, a light influence area LE in which each of the plurality of (for example, n) light emission regions L aligned from the one end ST side to the other end EN side in the Y direction gives influence in the first direction (Y direction). As the boundaries of the influence area LE, a range of 100% to 5% is practically sufficient when the luminance at the light emission center is 100%, but a range of 100% to equal to or lower than 1% is desirable. It is desirable that a lower limit of the range be set to a value equal to or lower than 1%. Even when the writing start timing AS2 of the first pixel row in the subsequent frame period is set after the completion timing AE1 of driving of the liquid crystal of the last pixel row in the previous frame period unlike FIG. 10 and FIG. 11, performing the light emission control as explained with reference to FIG. 11 further shortens the interval (time) between the completion timing AE1 and the start timing AS2.

As schematically indicated by the influence area LE in FIG. 11, each of the light emission regions L aligned in the Y direction does not emit light linearly along the direction in which the region faces the display panel 40 but emits light such that the light spreads radially in the Y direction as well. Thus, each pixel row of the display panel 40 is illuminated not only during a period where light is emitted from the light emission region L at a position directly facing the pixel row but also during periods where light is emitted from the light emission regions L covered by the influence areas LE. For example, in FIG. 11, a period during which the pixel row facing the (n−1)-th emission region L is illuminated is not only the period LT(n−1) and corresponds to an irradiation period BT covered by the influence areas LE from the period LTm to the period LTn. The period LTm is a period during which the m-th light emission region L is lit, and the period LTn is a period during which the n-th light emission region L is lit.

The start timing and the end timing of light emission of each of the light emission regions L are desirably determined such that the amount of light with which the display panel 40 is illuminated before the arrow SE1 and after the arrow SS2 with the influence areas LE to a minimum (ideally, zero).

Figure 12:
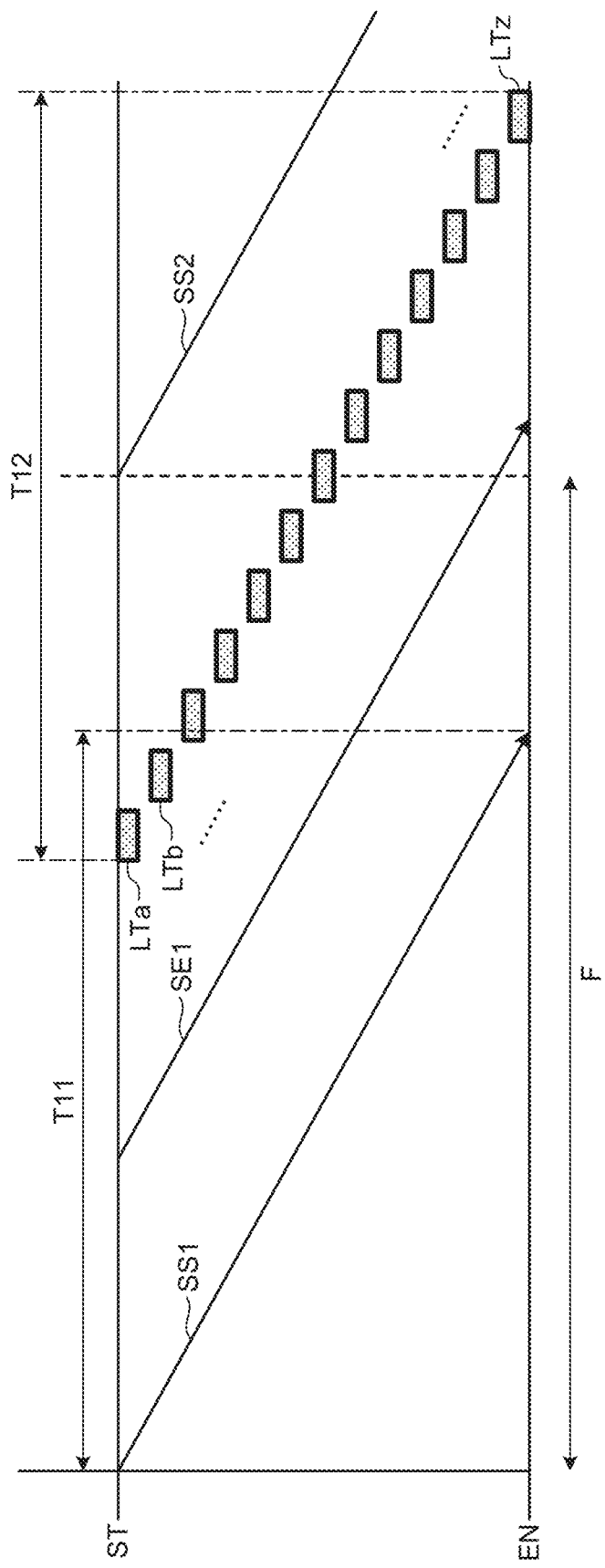
FIG. 12 is a time chart illustrating light emission control in a previously designed example.
Figure 13:
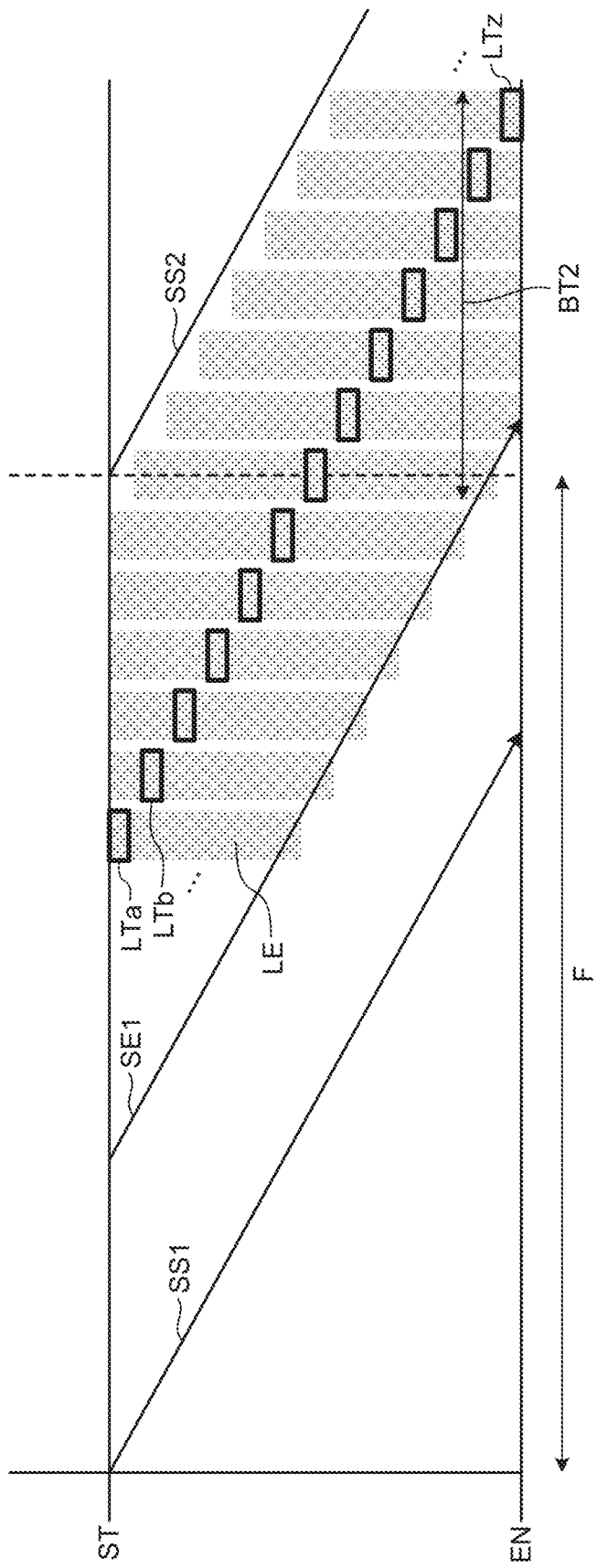
FIG. 13 is a time chart illustrating light emission control in the previously designed example.

FIG. 12 and FIG. 13 are time charts illustrating light emission control in a previously designed example. FIG. 12 illustrates a first period T11 as a period from the drive timing of the first driven pixel row to the drive timing of the last driven pixel row. FIG. 12 illustrates a second period T12 as a period from the light emission timing of the first light emission region to the light emission timing of the last light emission region. As illustrated in FIG. 12, the first period T11 and the second period T12 are substantially equal to each other in the previously designed example.

In FIG. 12 and FIG. 13, the light emission periods of the light emission regions L are indicated by periods LTa, LTb, . . . , and LTz. The period LTa is, for example, the light emission period of the light emission region L1 illustrated in FIG. 4. The period LTz is, for example, the light emission period of the light emission region Ln illustrated in FIG. 4. FIG. 13 illustrates an irradiation period BT2 as a period during which a specific pixel row is substantially illuminated by the above-mentioned influence areas LE. The first period T1 in FIG. 10 and the first period T11 in FIG. 12 are substantially equal to each other. On the other hand, the irradiation period BT2 is clearly longer than the irradiation period BT. Thus, in the case where the first period T11 and the second period T12 are equal to each other, the period during which the specific pixel row is illuminated becomes longer than that when the second period T2 is shorter than the first period T1. That is to say, when the driving order of the pixel rows and the light emission order of the light emission regions L are the order from the one side (for example, the one end ST) to the other side (for example, the other end EN) as in the first embodiment and the previously designed example, light irradiation time for each pixel row (for example, the irradiation period BT2) is longer in the previously designed example. The afterimage is therefore more likely to be viewed in display output of the moving image therein. The luminance of each light emission region L may be adjusted appropriately to make light intensity distribution in the Y direction more uniform while taking into account that light irradiation time at positions close to the respective ends in the Y direction is relatively shorter than light irradiation time at positions close to the center in the Y direction. Reflection of light by structures (such as the housing of the display device 50) in the vicinities of both ends in the Y direction may be taken into account. Similar control of the light intensity may be applied to other embodiments and modifications thereof, which will be described later.

In contrast, according to the first embodiment, the afterimage is less likely to be viewed in the display output of the moving image because the second period T2 is shorter than the first period T1. Thus, according to the first embodiment, the frame rate can be improved easily by setting the start point of the arrow SS2 before the completion point of the arrow SE1 while the afterimage can be reduced by shortening the second period T2 than the first period T1.

The first embodiment exemplifies one pixel row serves as the first driven pixel row, and another pixel row serves as the last driven pixel row. However, the present disclosure is not limited thereto. The number of the pixel rows each serving as the first driven pixel row may be two or more, and the number of the pixel rows each serving as the last driven pixel row may be two or more. The first embodiment also exemplifies one light emission region serves as the first light emission region, and another light emission region serves as the last light emission region. However, the present disclosure is not limited thereto. The number of the light emission regions each serving as the first light emission region may be two or more, and the number of the light emission regions each serving as the last light emission region may be two or more.

Second Embodiment

Hereinafter, a second embodiment differing from the first embodiment will be described below with reference to FIG. 14 and FIG. 15. The second embodiment employs the display panel 40A explained with reference to FIG. 5. The other configurations of the second embodiment are similar to those of the first embodiment unless otherwise specified.

In the above-described configuration illustrated in FIG. 5, the scan directions of the image display region 41a and the image display region 41*b* are symmetrical with respect to the boundary CL. Specifically, in the second embodiment, scanning in the image display region 41*a* is performed from the boundary CL to one end in the Y direction, and scanning in the image display region 41*b* is performed from the boundary CL to the other end in the Y direction. That is to say, the first driven pixel row and the first light emission region L are arranged at the center in the first direction (Y direction). The last driven pixel row and the last light emission region L are arranged at both ends in the first direction (Y direction). The driving order of the pixel rows and the light emission order of the light emission regions L are the order from the center to both ends.

Figure 14:
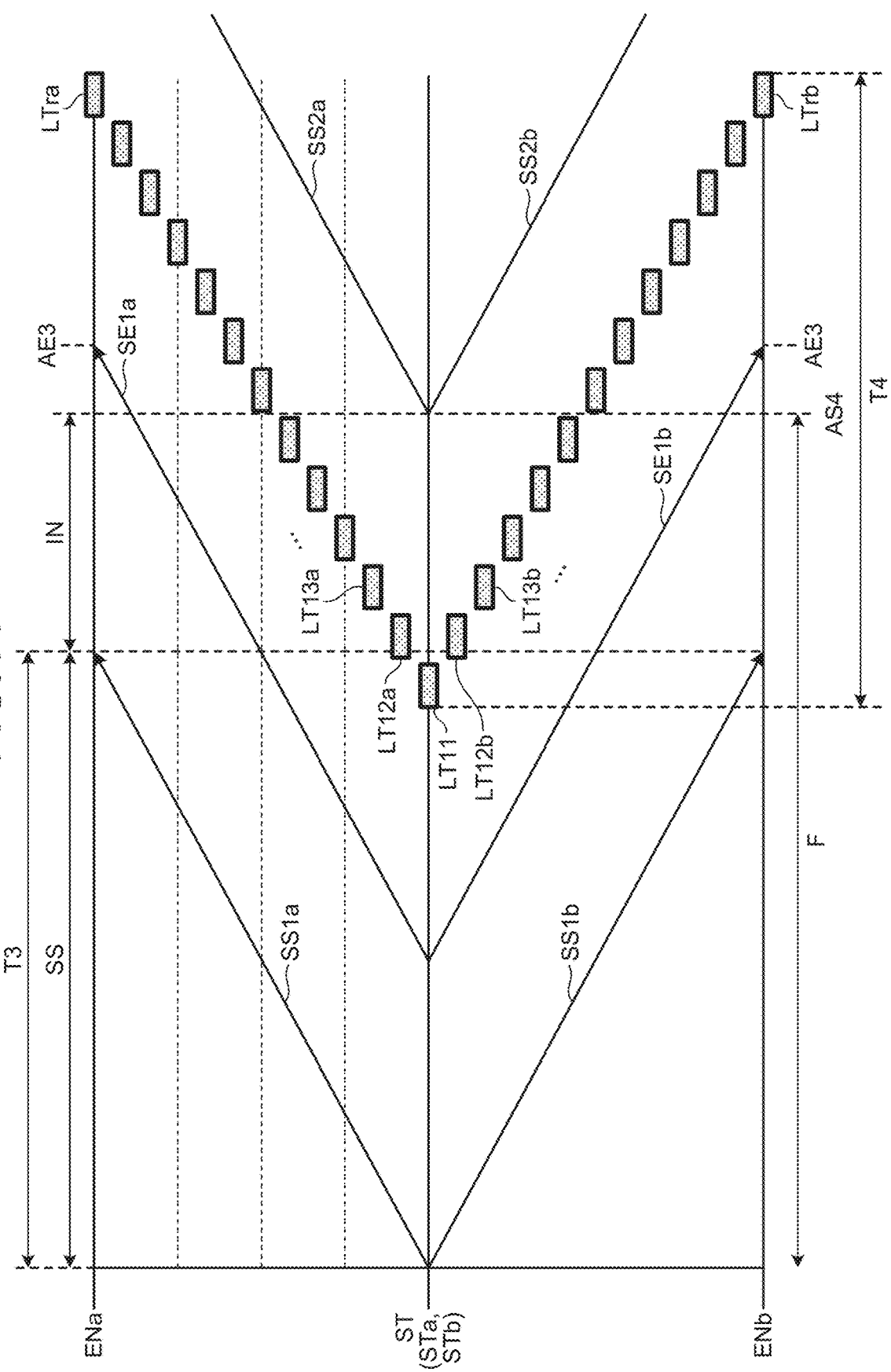
FIG. 14 is a time chart illustrating light emission control according to a second embodiment.

FIG. 14 is a time chart illustrating the light emission control in the second embodiment. In the second embodiment, based on the above explanation regarding FIG. 5, an output target of a drive signal transitions sequentially from one end STa to one end ENa in the image display region 41*a* as illustrated in FIG. 14 and other figures. The output target of the drive signal transitions sequentially from one end STb to the other end ENb in the image display region 41*b*. In explanation of the case in which scanning progresses from the boundary CL to both ends as in the second embodiment, simply referring to one end ST encompasses the one end STa and the one end STb.

In FIG. 14 and other figures, progression of scanning that is performed sequentially from the one end STa side to the one end ENa side within one frame period F is indicated by an arrow SS1*a*. The drive timings of the sub pixels 49 in the pixel rows contained in the image display region 41*a* correspond to the progression of the scanning that is indicated by the arrow SS1*a*. Progression of scanning that is performed sequentially from the one end STb side to the other end ENb side within one frame period F is indicated by an arrow SS1*b*. The drive timings of the sub pixels 49 in the pixel rows contained in the image display region 41*b* correspond to the progression of the scanning that is indicated by the arrow SS1*b*.

In FIG. 14 and other figures, progression of the response completion timings of the sub pixels 49 in the pixel rows that occurs in response to the progression of the scanning indicated by the arrow SS1*a*, is indicated by an arrow SE1*a*. Progression of the response completion timings of the sub pixels 49 in the pixel rows that occurs in response to the progression of the scanning indicated by the arrow SS1*b*, is indicated by an arrow SE1*b*. Progression of scanning corresponding to a subsequent frame image is indicated by arrows SS2*a* and SS2*b*. A period between the end timing of the period SS during which scanning is performed, that is, the end timing of each of the arrows SS1*a* and SS1*b*, and the start timing of each of the arrows SS2*a* and SS2*b* is represented by an interval IN. As illustrated in FIG. 14, a writing start timing AS4 of the first pixel row in the subsequent frame period of two consecutive frame periods is set before a completion timing AE3 of driving of the liquid crystal of the last pixel row in the previous frame period thereof, in the second embodiment.

When a period from the drive timing of the first driven pixel row to the drive timing of the last driven pixel row is referred to as a first period T3, and a period from the light emission timing of the first light emission region to the light emission timing of the last light emission region is referred to as a second period T4, there is no substantial difference between the first period T3 and the second period T4 in the second embodiment.

In the second embodiment, the light emission timing control of the light emission regions L progresses from the one end ST toward the one end ENa and the other end ENb in the same manner as scanning. In FIG. 14, the starts and the ends of light emission of the light emission regions L that progress at a constant cycle from the one end STa to the one end ENa, are indicated by periods LT11, LT12*a*, LT13*a*, . . . , and LTra aligned at the constant cycle in the time direction. The starts and the ends of light emission of the light emission regions L that progress at a constant cycle from the one end STb to the other end ENb, are indicated by periods LT11, LT12*b*, LT13*b*, . . . , and LTrb aligned at the constant cycle in the time direction. The period LT11 is, for example, the light emission period of the light emission region L11 illustrated in FIG. 5. The period LTra is, for example, the light emission period of a light emission region Lra illustrated in FIG. 5. The period LTrb is, for example, the light emission period of a light emission region Lrb illustrated in FIG. 5.

The start timing and the end timing of the period LT12*a* are substantially equal to the start timing and the end timing of the period LT12*b*, respectively. The start timing and the end timing of the period LT13*a* are substantially equal to the start timing and the end timing of the period LT13*b*, respectively. Thereafter, similarly the start timing and the end timing of the period LTra are substantially equal to the start timing and the end timing of the period LTrb, respectively. In FIG. 14 and other figures, the light emission region L11 (see FIG. 5) arranged at a position corresponding to the boundary CL straddles both the image display region 41*a* and the image display region 41*b*, so that the light emission period (period LT11) of the light emission region L11 is shared by both. Alternatively, light emission regions L that are respectively provided for the image display region 41*a* and the image display region 41*b* may emit light simultaneously at a timing corresponding to the period LT11.

Figure 15:
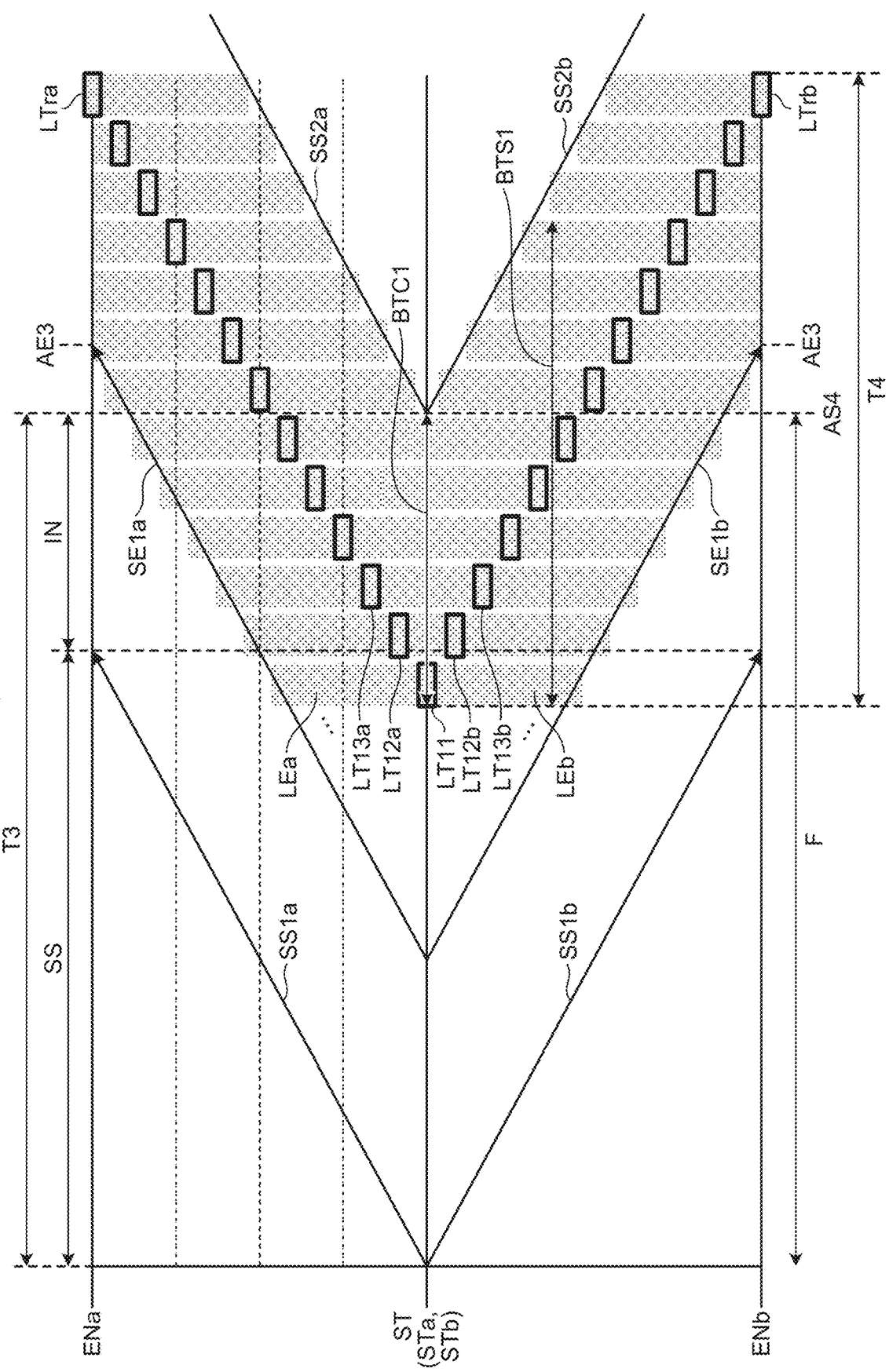
FIG. 15 is a time chart illustrating an example of light irradiation periods depending on light emission periods of a plurality of light emission regions.

FIG. 15 is a time chart illustrating examples of light irradiation periods BTC1 and BTS1 depending on the light emission periods of the light emission regions L. The time chart of FIG. 15 is obtained by further adding, to the time chart illustrated in FIG. 14, light influence areas LEa and LEb in which the plurality of (for example, n) light emission regions L aligned in the Y direction give influences in the first direction (Y direction). In FIG. 15 and other figures, the influence area LE that reaches the one end ENa in the Y direction with respect to one light emission region L is defined as the influence area LEa. The influence area LE that reaches the other end ENb in the Y direction with respect to one light emission region L is defined as the influence area LEb. Simply referring to the influence areas LE encompasses the influence areas LEa and LEb.

In the same manner as in FIG. 11, each of the light emission regions L aligned in the Y direction emits light such that light spreads radially in the Y direction as well, as schematically illustrated by the influence areas LE in FIG. 15. In the second embodiment, the one end ST is at the center in the Y direction. Therefore, time (for example, the irradiation period BTC1) during which the pixel row at the center in the Y direction is illuminated is affected only by the influence areas LE that reach the center side in the Y direction from the light emission regions other than the light emission region corresponding to the period LT11. Substantially, within the irradiation period BTC1, the time during which the pixel row at the center in the Y direction is illuminated, is affected by the light sources that respectively emit in the periods LT12*a*, LT12*b*, LT13*a*, and LT13*b* in each of which the shaded area in FIG. 15 reaches the center. Time during which the pixel row at an end portion on the one end ENa side in the Y direction is illuminated, is only affected by the influence areas LE that reach the one end ENa side among the influence areas LE generated by the light emission regions L other than the light emission region L corresponding to the period LTra. The time during which the one end ENa is illuminated is affected by the light sources that respectively emit in the periods in each of which the shaded area in FIG. 15 reaches the one end ENa. Time during which the pixel row at an end portion on the other end ENb side in the Y direction is illuminated, is only affected by the influence areas LE that reach the other end ENb side among the influence areas LE generated by the light emission regions L other than the light emission region L corresponding to the period LTrb. The time during which the other end ENb is illuminated is affected by the light sources that respectively emit in the periods in each of which the shaded area in FIG. 15 reaches the other end ENb. On the other hand, time (for example, the irradiation period BTS1) during which the pixel rows between the center and both ends in the Y direction are illuminated, is affected by the influence areas LE that reach the center side and both ends in the Y direction among the influence areas LE generated by the light emission regions L.

The irradiation period BTC1 is shorter than the irradiation period BTS1 due to the above-mentioned influences by the influence areas LE. This indicates that light irradiation time in the center of the frame image and the vicinity thereof is shorter. The center of the frame image and the vicinity thereof are areas where the viewpoint of the user of the display device 50 is more likely to be focused. On the other hand, the total light intensity (luminance×time) is substantially equal between the vicinity of the irradiation period BTC1 affected by the influence areas LE from the upper and lower directions and the vicinity of the irradiation period BTS1 affected by the influence areas LE from one direction thereof. This can restrain the afterimage from being visually recognized in the center of the frame image and the vicinity thereof where the viewpoint of the user is more likely to be focused. Since scanning and light emission progress in parallel from the center to both ends in the Y direction, one frame period F can be easily shortened as compared to the case where scanning and light emission progress from one end to the other end in the Y direction even when the number of pixel rows in the image is the same. As also explained in the first embodiment, the luminance of each light emission region L may be adjusted appropriately such that the light intensities in the vicinities of the respective ends (one end ENa side and the other end ENb side) in the Y direction are substantially equal to the light intensities of the other regions while taking into account that light irradiation time at the ends in the Y direction is relatively shorter. Reflection of light by structures (such as the housing of the display device 50) in the vicinities of both ends in the Y direction may be taken into account. Similar control of light intensity may be applied to modifications (first, second, and third modifications of the second embodiment) and a third embodiment in which the configuration illustrated in FIG. 5 is employed as will be described later.

In the example illustrated in FIG. 14 and FIG. 15, the period LT11 precedes the interval IN in terms of time. Alternatively, a part or the entire of the period LT11 may be within the interval IN. Even when the writing start timing AS4 of the first pixel row in the subsequent frame period is set after the completion timing AE3 of driving of the liquid crystal of the last pixel row in the previous frame period unlike FIG. 14 and FIG. 15, performing the light emission control as explained with reference to FIG. 15 further shortens the interval (time) between the completion timing AE3 and the start timing AS4.

Tendency of an image that is viewed when a specific moving image pattern is displayed in each of the first embodiment, the previously designed example, and the second embodiment will be explained with reference to FIG. 16 and FIG. 17.

Figure 16:
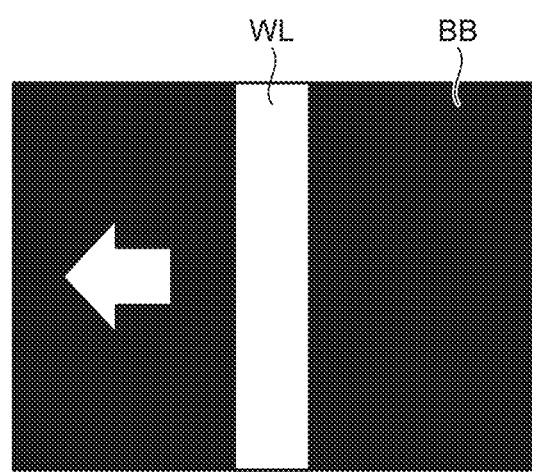
FIG. 16 is a schematic view illustrating an example of a moving image.

FIG. 16 is a schematic view illustrating an example of a moving image. As illustrated in FIG. 16, assume that the case where the moving image depicting a white rectangle WL that keeps moving in one direction in the black background BB is represented by the update and output of a plurality of frame images. The lengthwise direction of the white band WL is orthogonal to the movement direction indicated by an arrow in FIG. 16.

Figure 17:
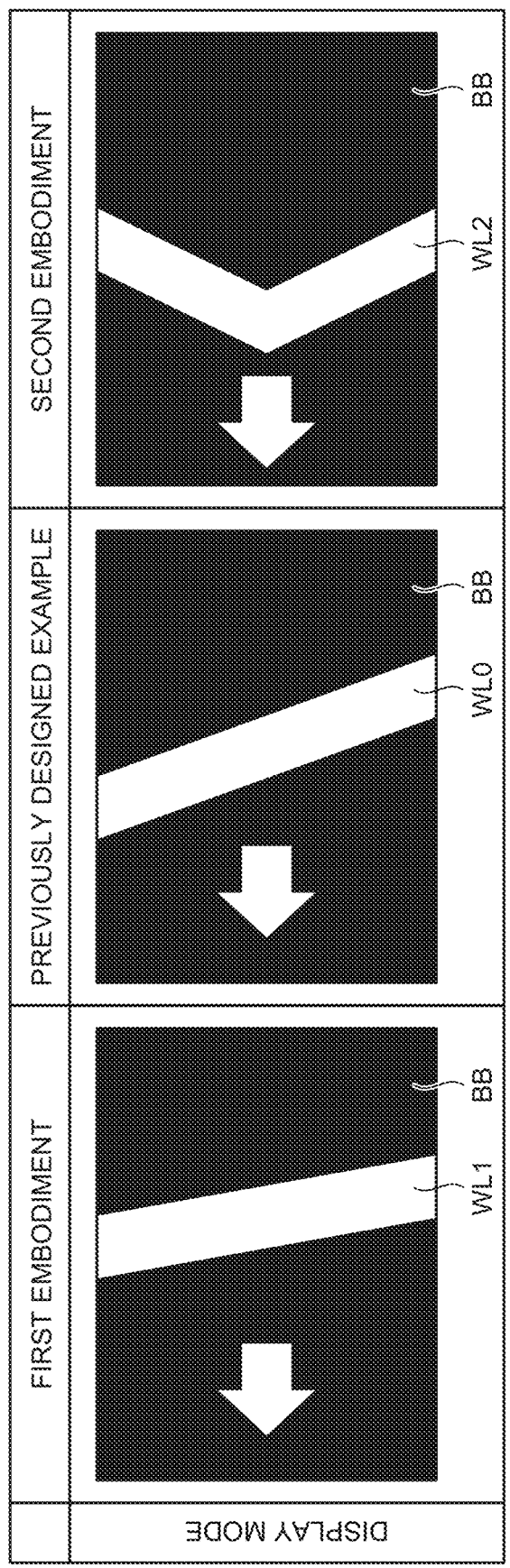
FIG. 17 is a schematic view simply illustrating how a white band illustrated in FIG. 16 is viewed in each of the first embodiment, the previously designed example, and the second embodiment.

FIG. 17 is a schematic view simply illustrating how the white band WL illustrated in FIG. 16 is viewed in each of the first embodiment, the previously designed example, and the second embodiment. As described above, the white band WL is a moving image including the frame images in which the white band WL orthogonal to the movement direction is displayed based on the input signal IS. In the first embodiment, like a white band WL1 illustrated in FIG. 17, the moving image tends to be viewed as a slanted white band in such a manner that the one end ST side thereof is slightly ahead of the other end EN side thereof with respect to the movement direction of the white band. This tendency in the first embodiment is due to time difference in the light emission timing between the light emission regions L on the one end ST side and the light emission regions L on the other end EN side. With the same principle, in the previously designed example, the time difference in the light emission timing between the light emission regions L on the one end ST side and the light emission regions L on the other end EN side is larger, and the white band tends to be viewed as a slanted white band WL0 in such a manner that the one end ST side thereof is more significantly ahead of the other end EN side with respect to the movement direction of the white band. On the other hand, in the second embodiment, the light emission timing transitions from the light emission region L at the center toward the light emission regions L at both ends in the Y direction. Therefore, the white band tends to be viewed as a white band WL2 with a center part bending in the traveling direction.

Modifications of Second Embodiment

Modifications of the second embodiment will be described below in turn with reference to FIG. 18 to FIG. 20. The modifications of the second embodiment differ from the second embodiment in that the second period is shorter than the first period.

First Modification of Second Embodiment

Figure 18:
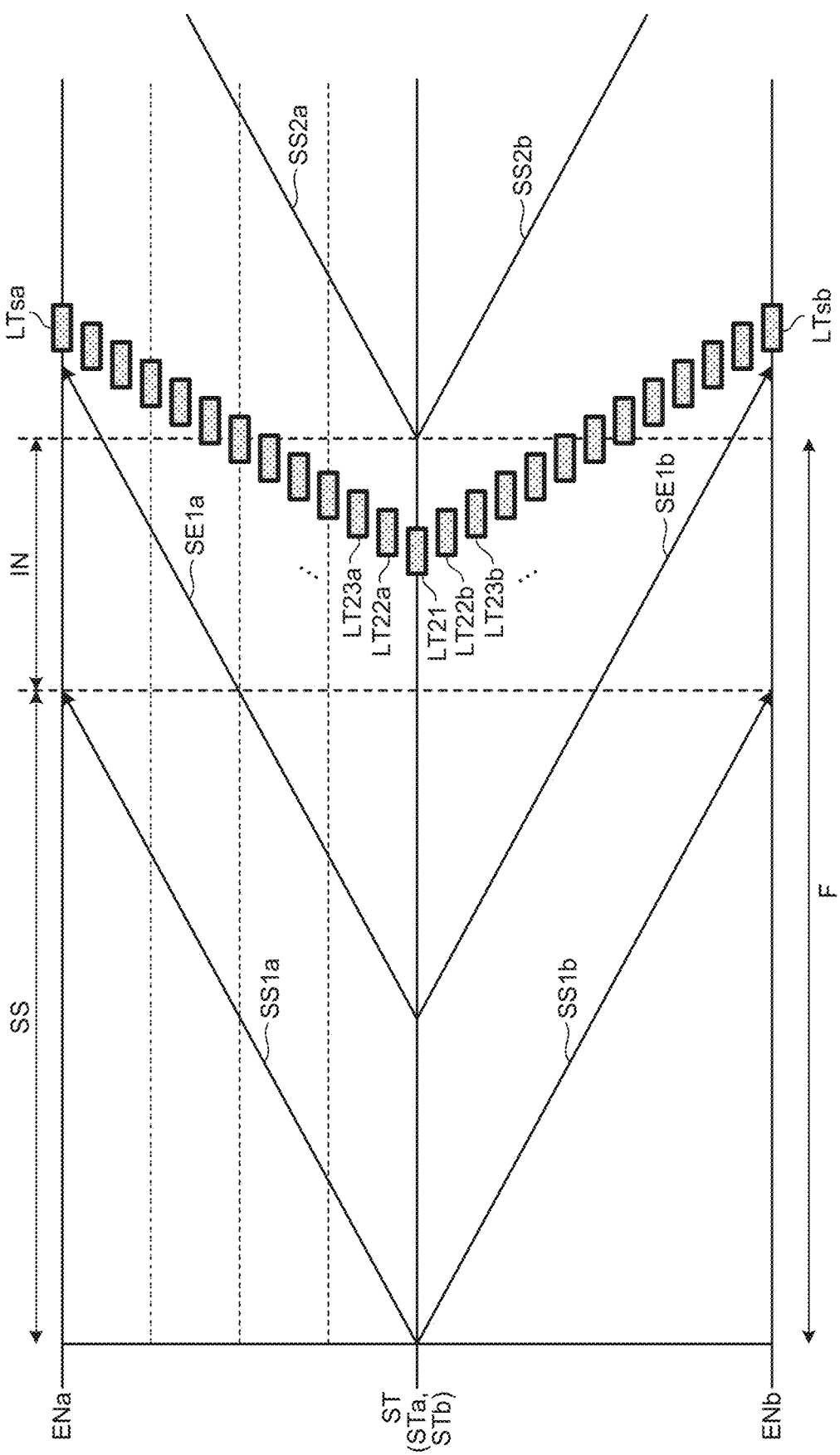
FIG. 18 is a time chart illustrating light emission control in a first modification of the second embodiment.

FIG. 18 is a time chart illustrating light emission control in a first modification of the second embodiment. In the first modification of the second embodiment, light emission timings of the light emission regions L are different. In the first modification of the second embodiment, the cycle at which the light emission region L that emits light is switched is constant. In the first modification of the second embodiment, the plurality of (for example, n) light emission regions L aligned in the Y direction therefore start and end light emission sequentially from the one end ST toward the one end ENa and the other end ENb at the constant cycle. In FIG. 18, the starts and the ends of light emission of the light emission regions L that occur at the constant cycle from the one end ST to the one end ENa, are indicated by periods LT21, LT22a, LT23a, . . . , and LTsa aligned at the constant cycle in the time direction. The starts and the ends of light emission of the light emission regions L that occur at the constant cycle from the one end ST to the other end ENb, are indicated by periods LT21, LT22b, LT23b, . . . , and LTsb aligned at the constant cycle in the time direction.

The start timing and the end timing of the period LT22a are substantially equal to the start timing and the end timing of the period LT22b, respectively. The start timing and the end timing of the period LT23a are substantially equal to the start timing and the end timing of the period LT23b, respectively. Thereafter, similarly the start timing and the end timing of the period LTsa are substantially equal to the start timing and the end timing of the period LTsb, respectively. In FIG. 18, the light emission region L11 (see FIG. 5) arranged at a position corresponding to the boundary CL straddles both the image display region 41a and the image display region 41b, so that the light emission period (period LT21) of the light emission region L11 is shared by both. Alternatively, light emission regions L that are respectively provided for the image display region 41a and the image display region 41b may emit light simultaneously at a timing corresponding to the period LT21.

Second Modification of Second Embodiment

Figure 19:
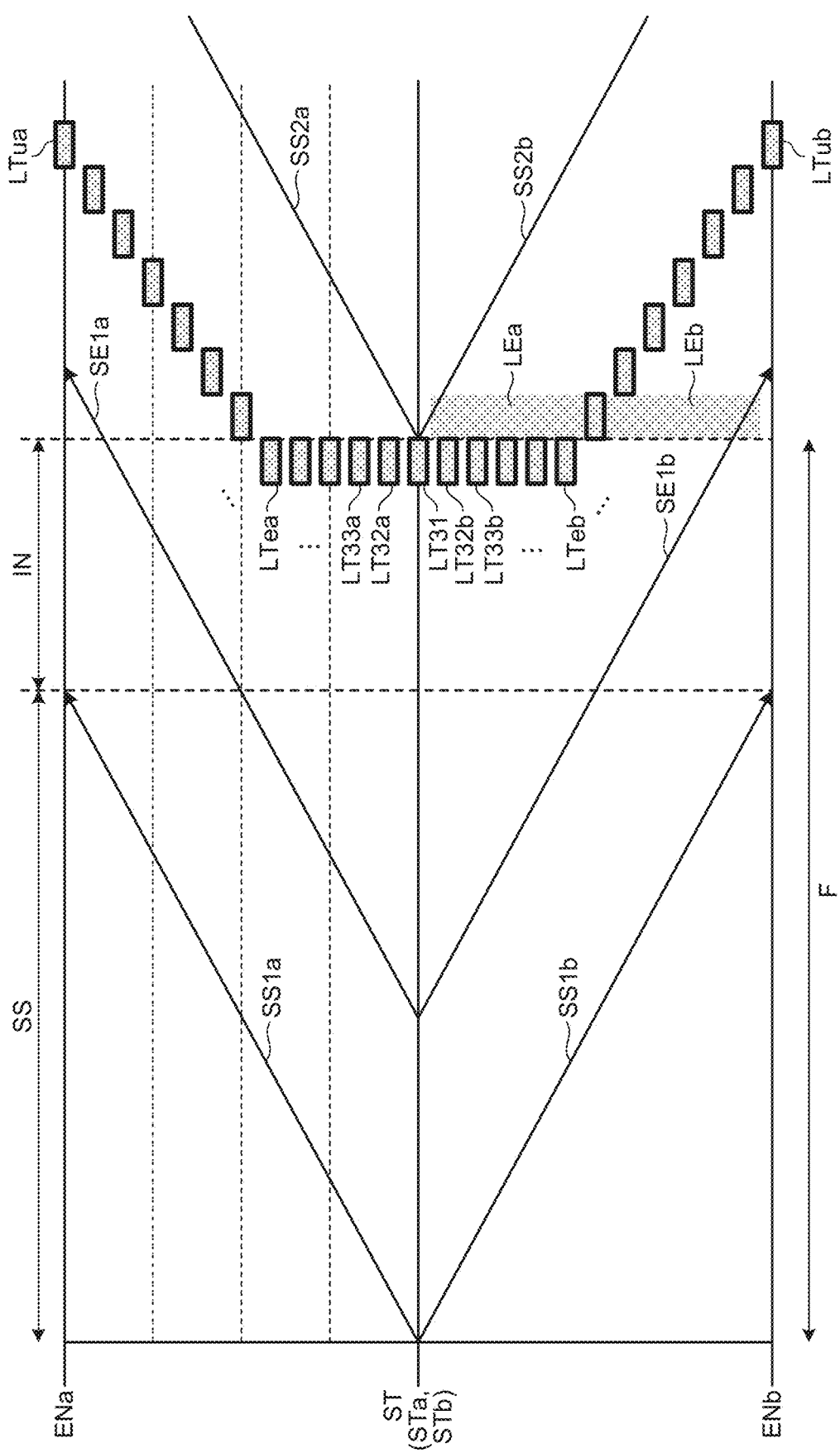
FIG. 19 is a time chart illustrating light emission control in a second modification of the second embodiment.

FIG. 19 is a time chart illustrating light emission control in a second modification of the second embodiment. In FIG. 19, the start sand the ends of light emission of the light emission regions L aligned from the one end ST to the one end ENa, are indicated by periods LT31, LT32a, LT33a, . . . , LTea, . . . , and LTua. The starts and the ends of light emission of the light emission regions L aligned from the one end ST to the other end ENb, are indicated by periods LT31, LT32b, LT33b, . . . , LTeb, . . . , and LTub.

In the second modification of the second embodiment, two or more light emission regions each serving as the first light emission region L are provided. Specifically, as illustrated in FIG. 19, the periods LT31, LT32a, LT33a, . . . , and LTea of two or more light emission regions L among the light emission regions L aligned from the one end ST to the one end ENa are generated first simultaneously. The periods LT31, LT32b, LT33b, . . . , and LTeb of two or more light emission regions L among the light emission regions L aligned from the one end ST to the other end ENb are generated first simultaneously.

Third Modification of Second Embodiment

Figure 20:
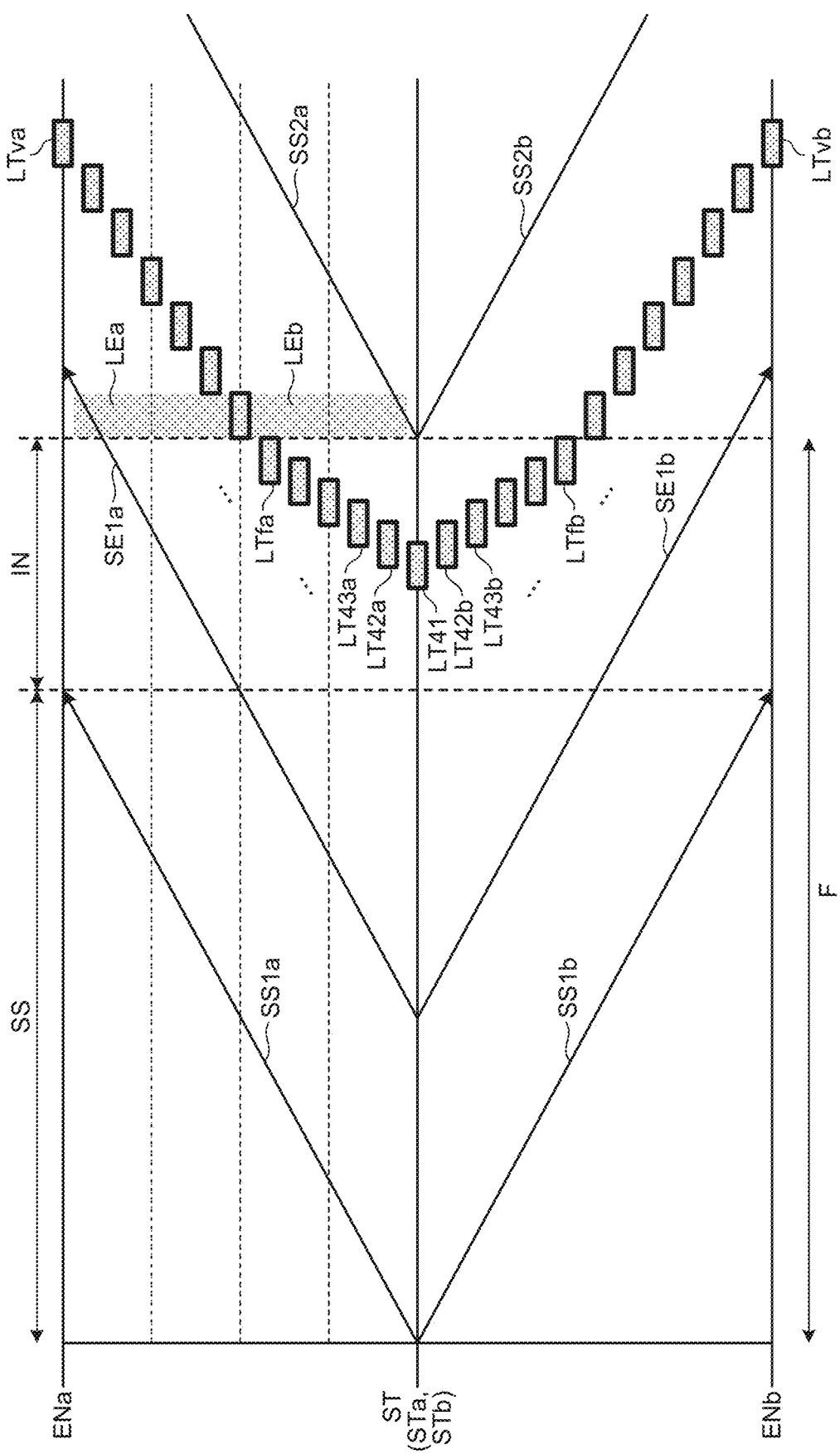
FIG. 20 is a time chart illustrating light emission control in a third modification of the second embodiment.

FIG. 20 is a time chart illustrating light emission control in a third modification of the second embodiment. In FIG. 20, the starts and the ends of light emission of the light emission regions L aligned from the one end ST to the one end ENa, are indicated by periods LT41, LT42a, LT43a, . . . , LTfa, . . . , and LTva. The starts and the ends of light emission of the light emission regions L aligned from the one end ST to the other end ENb, are indicated by periods LT41, LT42b, LT43b, . . . , LTfb, . . . , and LTvb.

In the third modification of the second embodiment, the cycle at which the light emission region L that emits light is switched in the second period, is not constant. Specifically, as illustrated in FIG. 20, a switching cycle of the periods LT41, LT42a, LT43a, . . . , and LTfa of two or more light emission regions L among the light emission regions L aligned from the one end ST to the one end ENa side is shorter than a switching cycle of the periods LTfa, and LTva. A switching cycle of the periods LT41, LT42b, LT43b, . . . , and LTfb of two or more light emission regions L among the light emission regions L aligned from the one end ST to the other end ENb side is shorter than a switching cycle of the periods LTfb, . . . , and LTvb.

Figure 21:
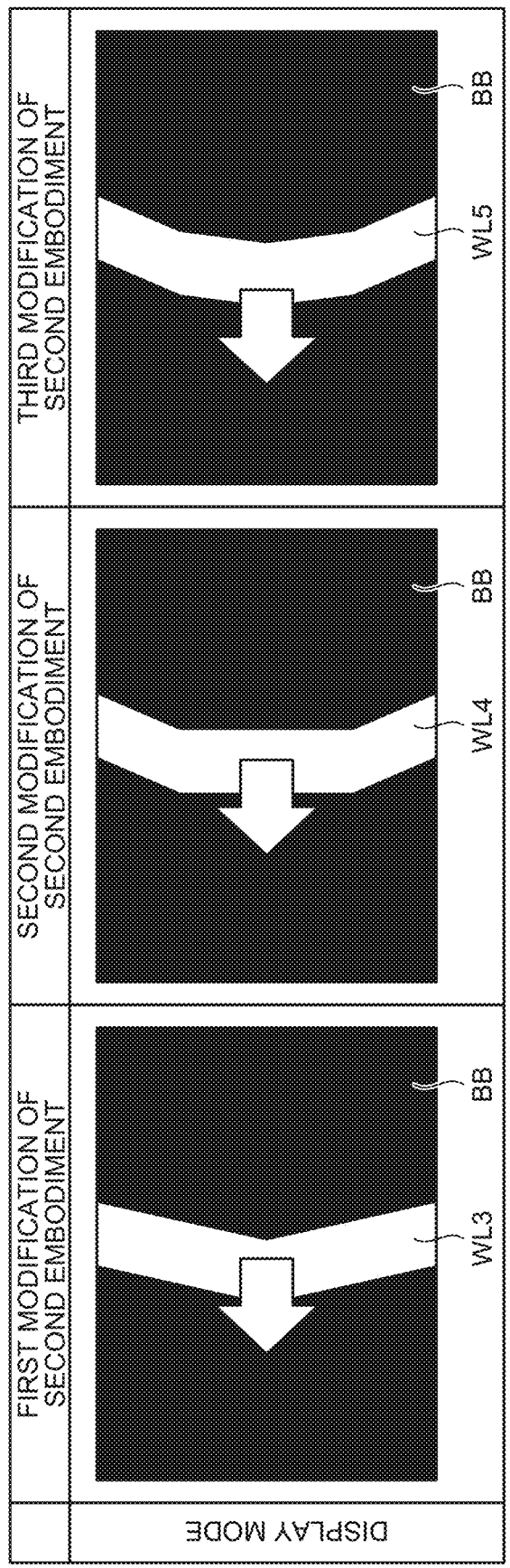
FIG. 21 is a schematic view simply illustrating how the white band illustrated in FIG. 16 is viewed in each of the modifications of the second embodiment.

FIG. 21 is a schematic view simply illustrating how the white band WL illustrated in FIG. 16 is viewed in each of the modifications of the second embodiment. As described above, in the second embodiment, since the light emission timing transitions from the light emission region L at the center toward the light emission regions L at both ends in the Y direction, the white band tends to be viewed as the white band WL2 with a center part bending in the traveling direction. Similarly, in the first modification of the second embodiment, the white band tends to be viewed as a white band WL3 with a center part bending in the traveling direction. However, in the first modification of the second embodiment, the transition of the light emission timing from the center to both ends in the Y direction is faster than that in the second embodiment. The degree of bending of the white band WL3 is therefore decreased as compared to the white band WL2. That is to say, the white band WL3 is more likely to be viewed as a white band closer to the white band WL.

In the second modification of the second embodiment, the light emission timings of two or more light emission regions L in the center and the vicinity of the center in the Y direction are the same. The white band therefore tends to be viewed as a white band with a part orthogonal to the traveling direction in the center and the vicinity of the center in the Y direction, like a white band WL4. That is to say, the possibility that a bending part is viewed in the center of the frame image and the vicinity thereof where the viewpoint of the user is more likely to be focused can be reduced.

In the third modification of the second embodiment, the transition of the light emission timing in the center and the vicinity of the center in the Y direction is faster than that in the second embodiment. The degree of bending in a white band WL5 that can be viewed at the center and the vicinity of the center in the Y direction is therefore decreased as compared to the white band WL2. That is to say, even when a bending part is viewed in the center of the frame image and the vicinity thereof where the viewpoint of the user is more likely to be focused, the degree of bending can be further decreased.

Third Embodiment

The third embodiment employs the display panel 40A explained with reference to FIG. 5. Hereinafter, the third embodiment is similar to the second embodiment unless otherwise specified.

In the configuration illustrated in FIG. 5 above, the scan directions of the image display region 41a and the image display region 41b are symmetrical with respect to the boundary CL. Specifically, in the third embodiment, scanning in the image display region 41a is performed from one end to the boundary CL in the Y direction, and scanning in the image display region 41b is performed from the other end to the boundary CL in the Y direction, contrary to the second embodiment. That is to say, the first driven pixel row and the first light emission region L are arranged at both ends in the first direction (Y direction). The last driven pixel row and the last light emission region L are arranged at the center in the first direction (Y direction). The driving order of the pixel rows and the light emission order of the light emission regions L are the order from both ends to the center.

Figure 22:
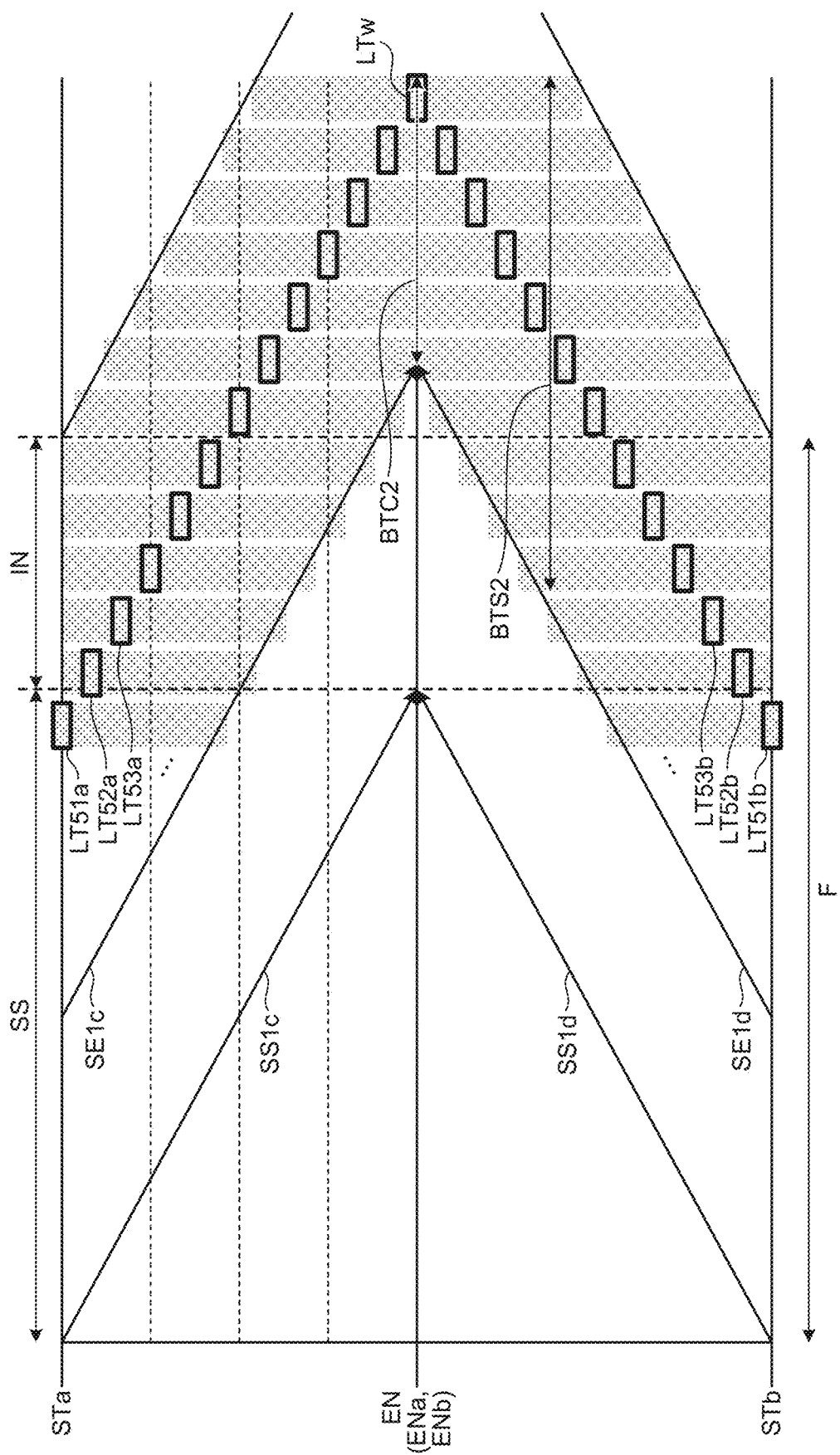
FIG. 22 is a time chart illustrating light emission control according to a third embodiment.

FIG. 22 is a time chart illustrating light emission control in the third embodiment. In the third embodiment, an output target of a drive signal transitions sequentially from the one end STa to the one end ENa in the image display region 41a as illustrated in FIG. 22 and other figures based on the above explanation regarding FIG. 5. The output target of the drive signal transitions sequentially from the one end STb to the other end ENb side in the image display region 41b. In explanation of the case in which scanning progresses from both ends to the boundary CL in the Y direction as in the third embodiment, simply referring to the other end EN encompasses the one end ENa and the other end ENb.

In FIG. 22, progression of scanning that is performed sequentially from the one end STa side to the one end ENa side within one frame period F is indicated by an arrow SS1c. The drive timings of the sub pixels 49 in the pixel rows contained in the image display region 41a correspond to the progression of the scanning that is indicated by the arrow SS1c. Progression of scanning that is performed sequentially from the one end STb side to the other end ENb side within one frame period F is indicated by an arrow SS1d. The drive timings of the sub pixels 49 in the pixel rows contained in the image display region 41b correspond to the progression of the scanning that is indicated by the arrow SS1d.

In FIG. 22, progression of the response completion timings of the sub pixels 49 in the pixel rows that occur in response to the progression of the scanning indicated by the arrow SS1c, is indicated by an arrow SE1c. Progression of the response completion timings of the sub pixels 49 in the pixel rows that occurs in response to the progression of the scanning indicated by the arrow SS1d, is indicated by an arrow SE1d. A period between the end timing of the period SS during which scanning is performed, that is, the end timing of each of the arrows SS1c and SS1d, and the start timing of each of the arrows SS2c and SS2d is represented by an interval IN.

When a period from the drive timing of the first driven pixel row to the drive timing of the last driven pixel row is referred to as a first period, and a period from the light emission timing of the first light emission region to the light emission timing of the last light emission region is referred to as a second period, there is no substantial difference between the first period and the second period in the third embodiment, as in the second embodiment.

In the third embodiment, the light emission timing control of the light emission regions L progresses from both ends (the one end STa and the one end STb) toward the other end EN in the Y direction, in the same manner as scanning. In FIG. 22, the starts and the ends of light emission of the light emission regions L that progress at a constant cycle from the one end STa to the one end ENa, are indicated by periods LT51a, LT52a, LT53a, . . . , and LTw aligned at the constant cycle in the time direction. The starts and the ends of light emission of the light emission regions L that progress at a constant cycle from the one end STb to the other end ENb, are indicated by periods LT51b, LT52b, LT53b, . . . , and LTw aligned at the constant cycle in the time direction.

The start timing and the end timing of the period LT51a are substantially equal to the start timing and the end timing of the period LT51b, respectively. The start timing and the end timing of the period LT52a are substantially equal to the start timing and the end timing of the period LT52b, respectively. Thereafter, similarly the start timings and the end timings of the light emission regions L having symmetrical positional relations with respect to the boundary CL, like the period LT53a and the period LT53b, are substantially equal to each other. In FIG. 22 and other figures, the image display region 41a and the image display region 41b share the light emission period LTw of the light emission region L arranged at a position corresponding to the boundary CL. Alternatively, light emission regions L that are respectively provided for the image display region 41a and the image display region 41b may emit light simultaneously at a timing corresponding to the period LTw.

In the same manner as in FIG. 11 and FIG. 15, each of the light emission regions L aligned in the Y direction emits light such that light spreads radially in the Y direction, as schematically illustrated by the influence areas LE in FIG. 22. In the third embodiment, since the other end EN is at the center in the Y direction, time (for example, an irradiation period BTC2) during which the pixel row on the center side in the Y direction is illuminated is affected only by the influence areas LE that reach the center side in the Y direction among the influence areas LE generated by the light emission regions L other than the light emission region L corresponding to the period LTw. Substantially, within the irradiation period BTC2, the time during which the pixel row at the center in the Y direction is illuminated, is affected by the light sources that respectively emit in the periods in each of which the shaded area in FIG. 22 reaches the center. Time during which the pixel row at an end portion on the one end STa side in the Y direction is illuminated, is affected only by the influence areas LE that reach the one end ENa side among the influence areas LE generated by the light emission regions L other than the light emission region L corresponding to the period LT51a. The time during which the one end ENa is illuminated is affected by the light sources that respectively emit in the periods in each of which the shaded area in FIG. 22 reaches the one end ENa. Time during which the pixel row at an end portion on the one end STb side in the Y direction is illuminated, is affected only by the influence areas LE that reach the other end ENb side among the influence areas LE generated by the light emission regions L other than the light emission region L corresponding to the period LT51b. The time during which the other end ENb is illuminated is affected by the light sources that respectively emit in the periods in each of which the shaded area in FIG. 22 reaches the other end ENb. On the other hand, time (for example, an irradiation period BTS2) during which the pixel rows between the center and both ends in the Y direction are illuminated, is affected by the influence areas LE that reach the center and the influence areas LE that reach the respective ends in the Y direction among the influence areas LE generated by the light emission regions L.

The irradiation period BTC2 is shorter than the irradiation period BTS2 due to the above-mentioned influences by the influence areas LE. This indicates that also in the third embodiment, light irradiation time in the center of the frame image and the vicinity thereof where the viewpoint of the user of the display device 50 is more likely to be focused is shorter, as in the second embodiment. This can restrain the afterimage from being visually recognized in the center of the frame image and the vicinity thereof where the viewpoint of the user is more likely to be focused. Since scanning and light emission progress in parallel from the center to both ends in the Y direction, one frame period F can be easily shortened as compared to the case where scanning and light emission progress from one end to the other end in the Y direction even when the number of pixel rows is the same.

As explained above, the third embodiment is substantially the same as the second embodiment except that the scan direction and the progress direction of the light emission control of the light emission regions L are reversed from those in the second embodiment. The modifications (first, second, and third modifications) of the second embodiment can therefore be applied also to the third embodiment by reversing the scan direction and the progress direction of the light emission control of the light emission regions L. Modifications of the third embodiment to which the modifications of the second embodiment are applied provide similar effects to those by the modifications of the second embodiment.

Fourth Embodiment

Next, a fourth embodiment will be explained with reference to FIG. 23. The fourth embodiment employs the display panel 40 explained with reference to FIG. 4. The fourth embodiment is similar to the first embodiment unless otherwise specified.

Figure 23:
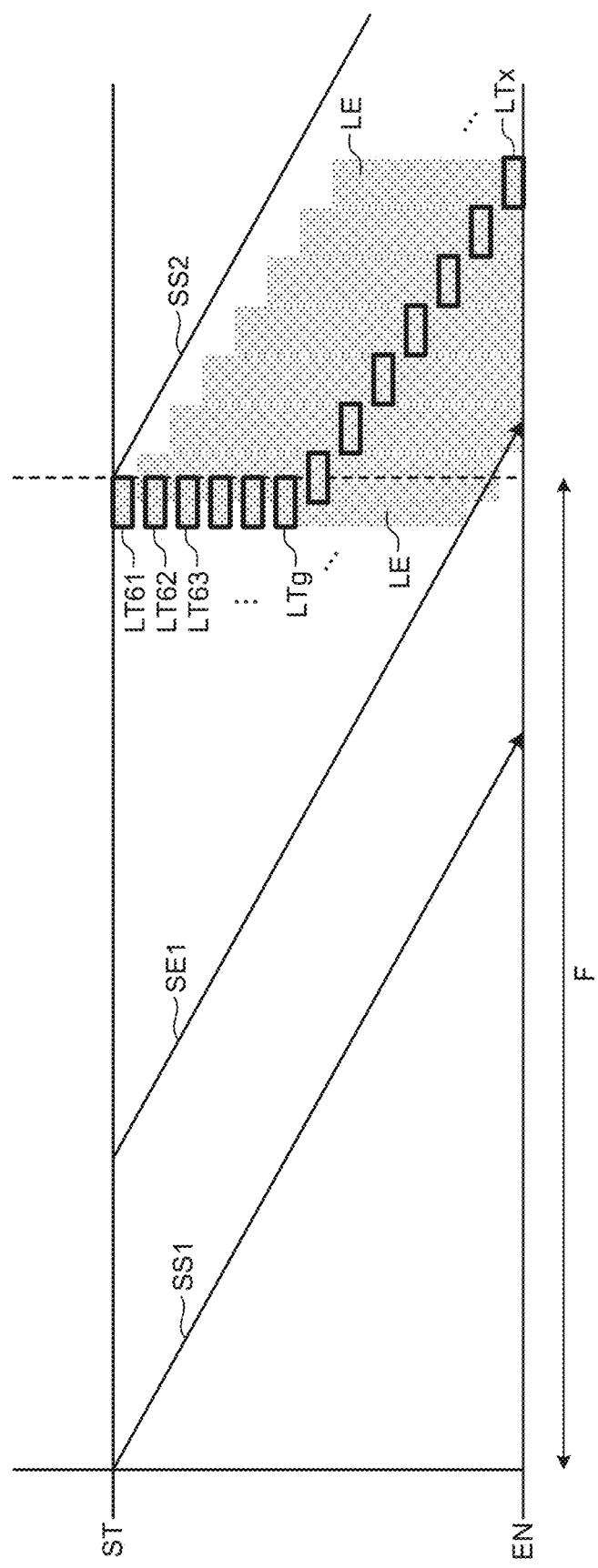
FIG. 23 is a time chart illustrating light emission control according to a fourth embodiment.

FIG. 23 is a time chart illustrating light emission control in the fourth embodiment. In FIG. 23, the starts and the ends of light emission of the light emission regions L aligned from the one end ST to the other end EN, are indicated by periods LT61, LT62, LT63, . . . , LTg, . . . , and LTx.

In the fourth embodiment, two or more light emission regions each serving as the first light emission region L are provided. Specifically, as illustrated in FIG. 23, the periods LT61, LT62, LT63, . . . , and LTg of two or more light emission regions L among the light emission regions L aligned from the one end ST to the other end EN side are generated first simultaneously. For the periods LTg . . . , and LTx, the start timing and the end timing of light emission are controlled to be switched at a constant cycle.

Fifth Embodiment

Next, a fifth embodiment will be explained with reference to FIG. 24. The fifth embodiment employs the display panel 40 explained with reference to FIG. 4. The fifth embodiment is similar to the first embodiment unless otherwise specified.

Figure 24:
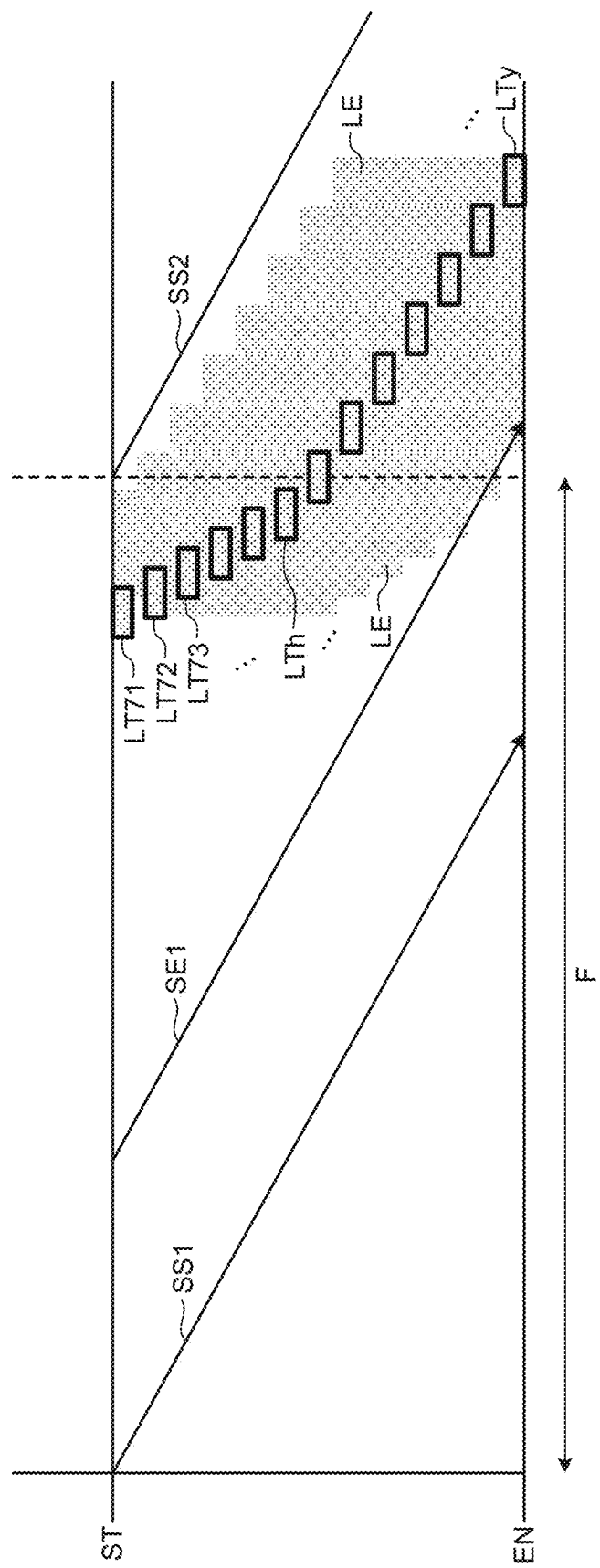
FIG. 24 is a time chart illustrating light emission control according to a fifth embodiment.

FIG. 24 is a time chart illustrating light emission control in the fifth embodiment. In FIG. 24, the starts and the ends of light emission of the light emission regions L aligned from the one end ST to the other end EN, are indicated by periods LT71, LT72, LT73, . . . , LTh, . . . , and LTy.

In the fifth embodiment, a cycle at which the light emission region L that emits light is switched in a second period is not constant. Specifically, as illustrated in FIG. 24, a switching cycle of the periods LT71, LT72, LT73, . . . , and LTh of two or more light emission regions L among the light emission regions L aligned from the one end ST to the other end EN side is shorter than a switching cycle of the periods LTh, . . . , and LTy.

Figure 25:
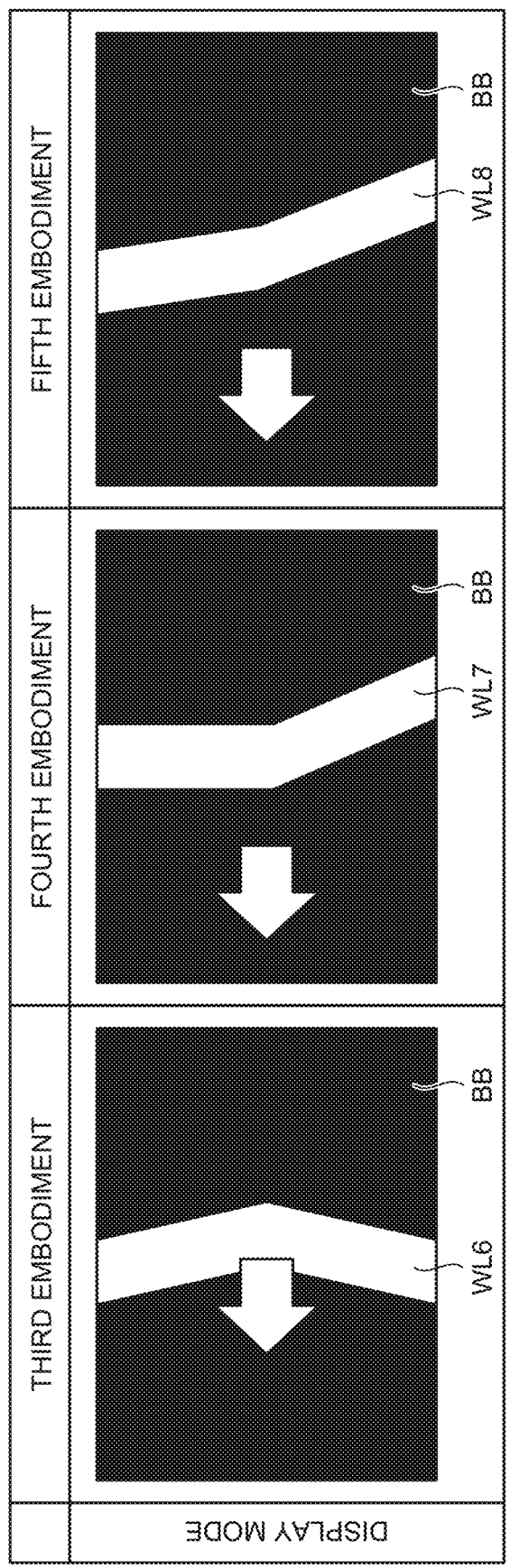
FIG. 25 is a schematic view simply illustrating how the white band illustrated in FIG. 16 is viewed in each of the third, fourth, and fifth embodiments.

FIG. 25 is a schematic view simply illustrating how the white band WL illustrated in FIG. 16 is viewed in each of the third, fourth, and fifth embodiments. As described above, in the second embodiment, since the light emission timing transitions from the light emission region L at the center toward the light emission regions L at both ends in the Y direction, the white band tends to be viewed as the white band WL2 with a center part bending in the traveling direction. In the third embodiment, the white band tends to be viewed as a white band WL6 with a center part bending in a direction opposite to the traveling direction, contrary to the second embodiment.

In the fifth embodiment, the light emission timings of two or more light emission regions L on the one end ST side are equal to one another. The white band therefore tends to be viewed as a white band with a part orthogonal to the traveling direction on the one end ST side, like a white band WL7.

In the fifth embodiment, transition of the light emission timings of some emission regions L on the one end ST side is faster than that on the other end EN side. The degree of inclination of the white band with respect to the direction orthogonal to the traveling direction is decreased on the one end ST side further than on the other end EN side, like a white band WL8.

Other action and effects provided by the modes described in the present embodiment that are obvious from description of the present specification or that can be conceived by those skilled in the art are understood to be provided by the present disclosure naturally.

What is claimed is:

1. A display device comprising:
a display panel in which a plurality of pixel rows are aligned in a first direction;
a light source device having a plurality of light emission regions aligned in the first direction; and
a controller configured to control light emission from each of the light emission regions, wherein
each of the pixel rows has a plurality of pixels aligned in a second direction intersecting with the first direction,
a second period is shorter than a first period, the first period being a period from a drive timing of one or more pixel rows that are driven first among the pixel rows related to display of one frame image to a drive timing of one or more other pixel rows that are driven last, the second period being a period from a light emission timing of one or more light emission regions that emit light first among the light emission regions related to the display of the one frame image to a light emission timing of one or more other light emission regions that emit light last,
the light emission timing of the one or more light emission regions that emit light first is different from the light emission timing of the one or more other light emission regions that emit light last,
the controller is configured to control the light source device such that each of the light emission regions has only one light emission period in one frame period,
the light emission regions for the display of the one frame image are divided into a first light emission region group and a second light emission region group that is controlled to emit light after the first light emission region group,
a lighting scan speed of light emission regions in the first light emission region group is faster than a drive scan speed of the pixel rows,
among light emission periods of the light emission regions included in the first light emission region group, two consecutive light emission periods partially overlap each other, and
among light emission periods of the light emission regions included in the second light emission region group, two consecutive light emission periods do not overlap each other.

2. The display device according to claim 1, wherein light emission timings of the respective light emission regions are different from each other.

3. The display device according to claim 2, wherein a cycle at which the light emission region that emits light is switched in the second period is constant.

4. The display device according to claim 2, wherein a cycle at which the light emission region that emits light is switched in the second period is not constant.

5. The display device according to claim 1, wherein the one or more light emission regions that emit light first include two or more light emission regions.

6. The display device according to claim 1, wherein a driving order of the pixel rows and a light emission order of the light emission regions are an order from one end side to another end side in the first direction.

7. The display device according to claim 1, wherein
the one or more pixel rows that are driven first and the one or more light emission regions that emit light first are arranged at a center in the first direction or at one of both ends in the first direction,
the one or more other pixel rows that are driven last and the one or more other light emission regions that emit light last are arranged at the center in the first direction or at another of both ends in the first direction, and
a driving order of the pixel rows and a light emission order of the light emission regions are an order from the one end side to the other end side.

8. The display device according to claim 7, comprising:
a first drive circuit configured to drive the pixel rows arranged on one end side in the first direction with respect to the center in the first direction; and
a second drive circuit configured to drive the pixel rows arranged on another end side in the first direction with respect to the center in the first direction.

9. The display device according to claim 1, wherein a light emission timing of at least one light emission region among the light emission regions related to display of one frame image is set after a drive timing of at least one pixel row among the pixel rows corresponding to an arrangement of the at least one light emission region.

10. The display device according to claim 1 that is mounted on virtual reality goggles.

11. The display device according to claim 1, wherein the first light emission region group is located in a center of the plurality of pixel rows in the first direction, and the second light emission region group is located at an end of the plurality of pixel rows in the first direction.

12. The display device according to claim 1, wherein a first switching cycle at which the light emission region that emits light is switched in the first light emission region group is shorter than a second switching at which the light emission region that emits light is switched in the second light emission region group.

13. A display device comprising:
a display panel in which a plurality of pixel rows are aligned in a first direction;
a light source device having a plurality of light emission regions aligned in the first direction; and
a controller configured to control light emission from each of the light emission regions, wherein
each of the pixel rows has a plurality of pixels aligned in a second direction intersecting with the first direction,
one or more pixel rows that are driven first and one or more light emission regions that emit light first are arranged at a center in the first direction or at one of both ends in the first direction,
one or more other pixel rows that are driven last and one or more other light emission regions that emit light last are arranged at the center in the first direction or at another of both ends in the first direction,
a driving order of the pixel rows and a light emission order of the light emission regions are an order from the one end side to the other end side,
the controller is configured to control the light source device such that each of the light emission regions has only one light emission period in one frame period,
the light emission regions for display of one frame image are divided into a first light emission region group and a second light emission region group that is controlled to emit light after the first light emission region group,
a lighting scan speed of light emission regions in the first light emission region group is faster than a drive scan speed of the pixel rows,
among light emission periods of the light emission regions included in the first light emission region group, two consecutive light emission periods partially overlap each other, and
among light emission periods of the light emission regions included in the second light emission region group, two consecutive light emission periods do not overlap each other.

14. The display device according to claim 13, comprising:
a first drive circuit configured to drive the pixel rows arranged on one end side in the first direction with respect to the center in the first direction; and
a second drive circuit configured to drive the pixel rows arranged on another end side in the first direction with respect to the center in the first direction.

15. The display device according to claim 13, wherein a light emission timing of at least one light emission region among the light emission regions related to display of one frame image is set after a drive timing of at least one pixel row among the pixel rows corresponding to an arrangement of the at least one light emission region.

16. The display device according to claim 13 that is mounted on virtual reality goggles.

17. The display device according to claim 13, wherein the first light emission region group is located in a center of the plurality of pixel rows in the first direction, and the second light emission region group is located at an end of the plurality of pixel rows in the first direction.

18. The display device according to claim 13, wherein a first switching cycle at which the light emission region that emits light is switched in the first light emission region group is shorter than a second switching at which the light emission region that emits light is switched in the second light emission region group.

* * * * *